(12) United States Patent
Miyagaki et al.

(10) Patent No.: US 7,322,700 B2
(45) Date of Patent: *Jan. 29, 2008

(54) IMAGE DISPLAY APPARATUS

(75) Inventors: Kazuya Miyagaki, Kanagawa (JP); Kenji Kameyama, Kanagawa (JP); Takanobu Osaka, Kanagawa (JP); Ikuo Katoh, Kanagawa (JP); Atsushi Takaura, Tokyo (JP); Kenji Namie, Kanagawa (JP); Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/519,936

(22) Filed: Sep. 13, 2006

(65) Prior Publication Data
US 2007/0008495 A1    Jan. 11, 2007

Related U.S. Application Data

(63) Continuation of application No. 10/370,737, filed on Feb. 24, 2003, now Pat. No. 7,125,121.

(30) Foreign Application Priority Data

Feb. 25, 2002 (JP) ............................ 2002-048010
Feb. 26, 2002 (JP) ............................ 2002-049840

(51) Int. Cl.
G03B 21/28 (2006.01)
G02F 1/1335 (2006.01)
G02F 1/00 (2006.01)
G02B 27/10 (2006.01)
G02B 27/44 (2006.01)
G02B 5/18 (2006.01)
H04N 5/74 (2006.01)

(52) U.S. Cl. ............................ 353/31; 353/38; 353/99; 349/57; 349/95; 349/113; 359/563; 359/570; 359/621; 359/623; 348/771

(58) Field of Classification Search ................. 353/31, 353/30, 38, 69, 98, 99, 122; 349/57, 95, 349/108, 109, 113, 144; 359/558, 563, 570, 359/621, 623, 685, 708, 733, 737, 652–654; 348/755, 764, 770, 771
See application file for complete search history.

(56) References Cited

U.S. PATENT DOCUMENTS 5,315,418 A    5/1994    Sprague et al. ............. 349/112
5,319,479 A    6/1994    Yamada et al. ............. 349/138

(Continued)

FOREIGN PATENT DOCUMENTS

JP    04-113308    4/1992

(Continued)

*Primary Examiner*—Rochelle Blackman
(74) *Attorney, Agent, or Firm*—Oblon, Spivak, McClelland, Maier & Neustadt, P.C.

(57) ABSTRACT

An image display apparatus includes an indicating element which modulates or emits light as a pixel in accordance with image information. A displacement unit optically displaces a position of the pixel for each of two or more sub-fields constituting an image field corresponding to the image information. A projection unit enlarges the pixel and projects an enlarged pixel on a screen. A pixel-profile deformation unit changes an optical intensity profile of the pixel.

13 Claims, 18 Drawing Sheets

U.S. PATENT DOCUMENTS

| | | | |
|---|---|---|---|
| 5,331,650 A | 7/1994 | Maeda et al. | 372/26 |
| 5,408,344 A | 4/1995 | Takiguchi et al. | 349/57 |
| 5,496,497 A | 3/1996 | Takiguchi et al. | 252/299.01 |
| 5,543,945 A | 8/1996 | Kimura et al. | 349/19 |
| 5,704,700 A | 1/1998 | Kappel et al. | 353/31 |
| 5,719,981 A | 2/1998 | Katoh et al. | 385/129 |
| 5,822,077 A | 10/1998 | Sasaki et al. | 358/296 |
| 5,969,780 A | 10/1999 | Matsumoto et al. | 349/106 |
| 6,061,042 A | 5/2000 | Takahashi et al. | 345/87 |
| 6,151,093 A | 11/2000 | Takiguchi et al. | 349/172 |
| 6,320,571 B1 | 11/2001 | Takahashi et al. | 345/204 |
| 6,351,299 B2 | 2/2002 | Takiguchi et al. | 349/121 |
| 6,497,488 B1 | 12/2002 | Yamauchi et al. | 353/38 |
| 6,514,328 B1 | 2/2003 | Katoh et al. | 106/31.28 |
| 7,125,121 B2 * | 10/2006 | Miyagaki et al. | 353/31 |
| 2002/0135729 A1 | 9/2002 | Tokita et al. | 349/172 |
| 2003/0090597 A1 | 5/2003 | Katoh et al. | 348/744 |

FOREIGN PATENT DOCUMENTS

| | | |
|---|---|---|
| JP | 05-289044 | 11/1993 |
| JP | 06-324320 | 11/1994 |
| JP | 08-194207 | 7/1996 |
| JP | 09-015548 | 1/1997 |
| JP | 09-054554 | 2/1997 |
| JP | 09-152572 | 6/1997 |
| JP | 09-230329 | 9/1997 |
| JP | 2000-098968 | 4/2000 |

* cited by examiner (CTF=40, HALF-WIDTH=50)

(CTF=40, HALF-WIDTH=30)

(CTF=40, HALF-WIDTH=80)

(CTF=40, HALF-WIDTH=60, RECESS INTENSITY=0)

(CTF=40, HALF-WIDTH=60 RECESS INTENSITY=40)

(CTF=40, HALF-WIDTH=60 RECESS INTENSITY=80)

22  23 24 25

32  33  36 34

46 42 47

ODD FIELD   EVEN FIELD   TOTAL

ODD FIELD   EVEN FIELD   TOTAL

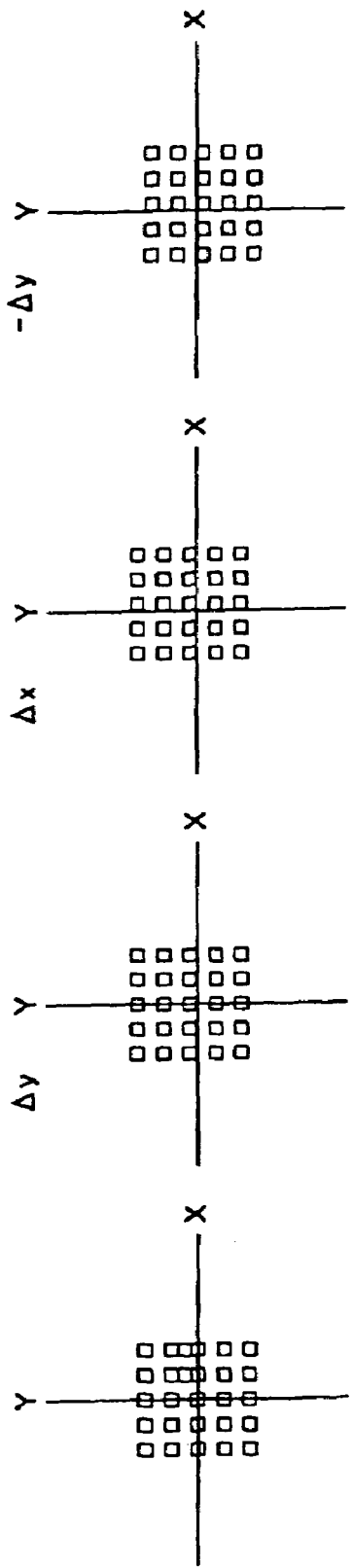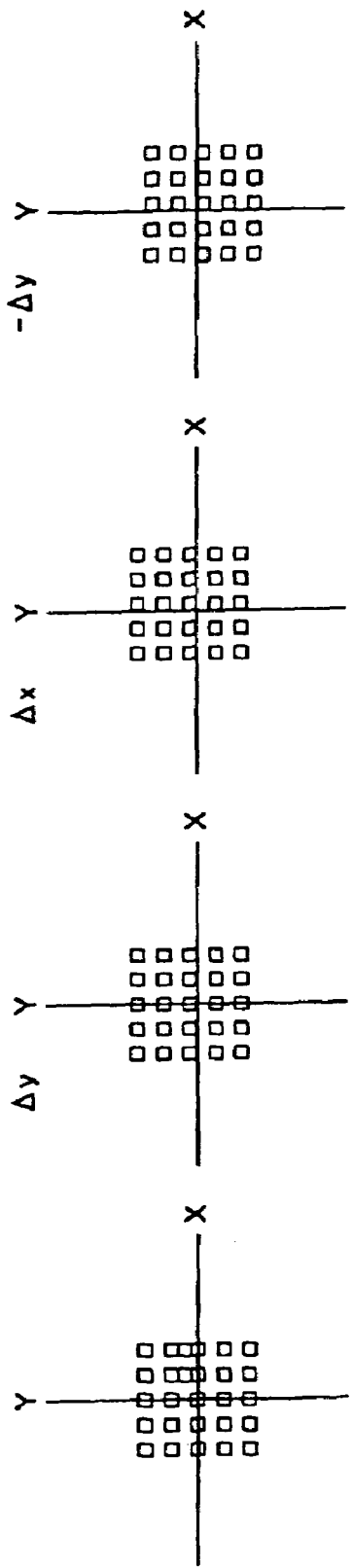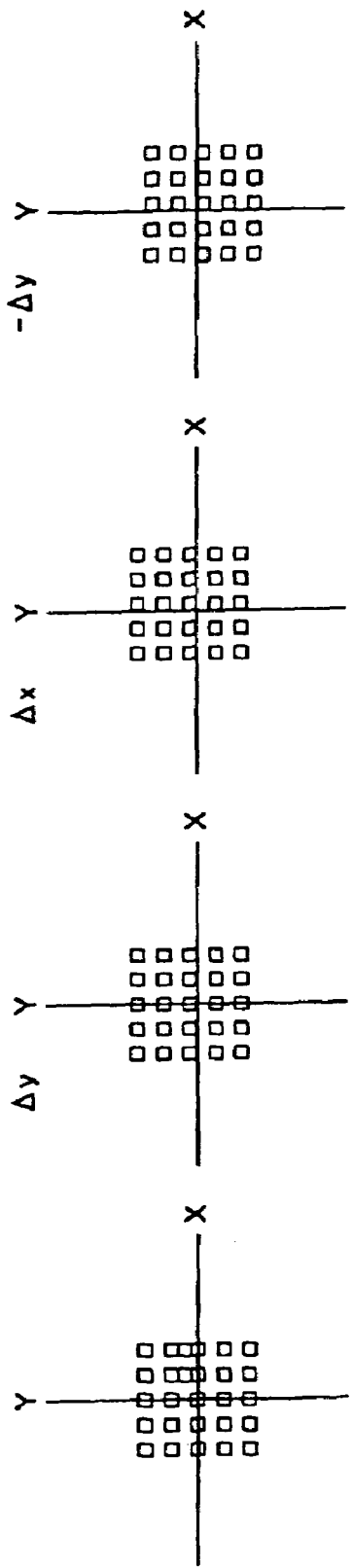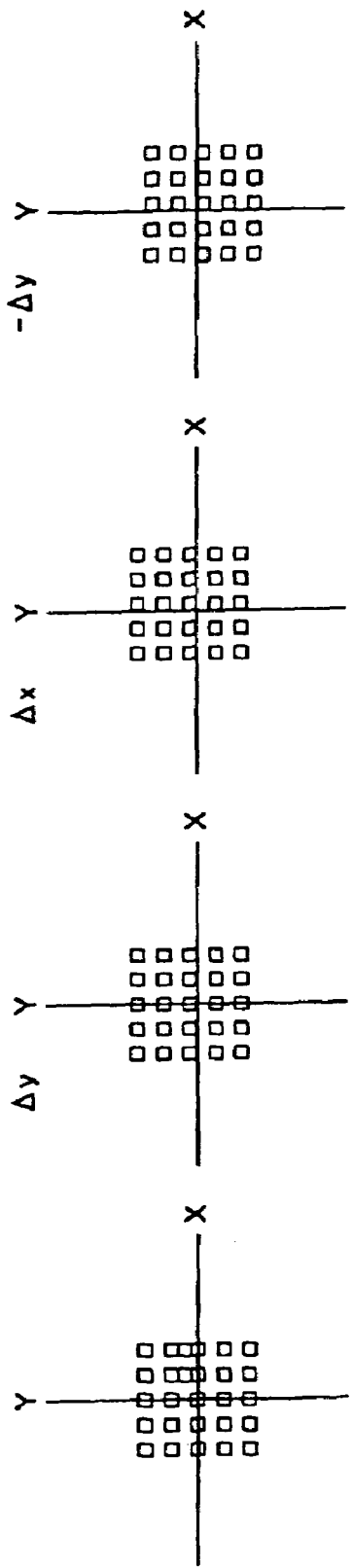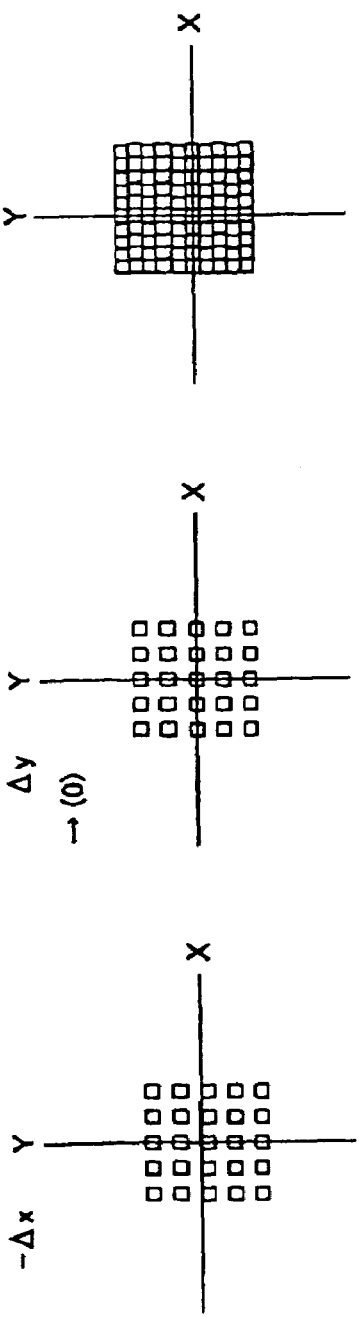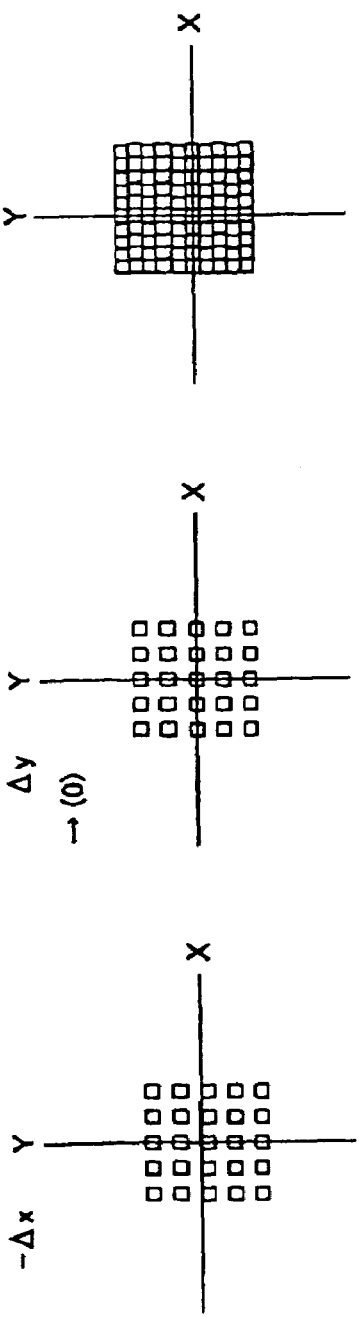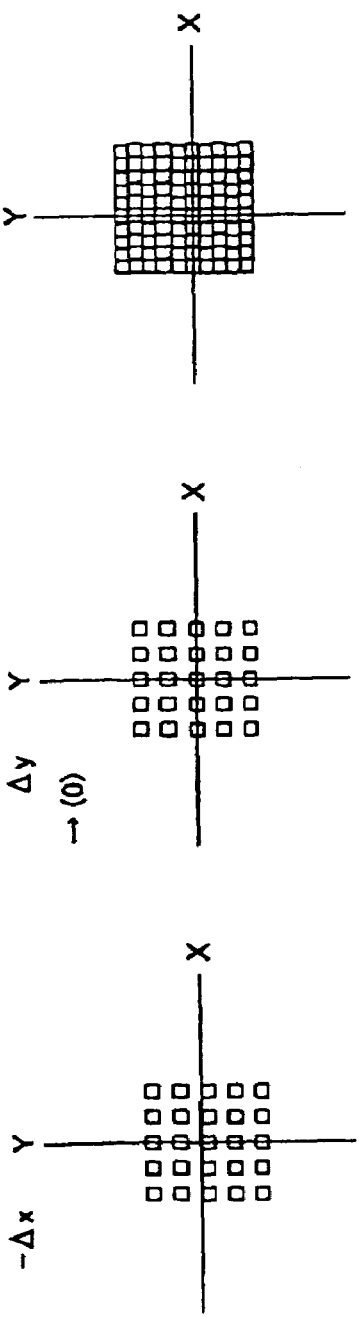

IMAGE DISPLAY APPARATUS

BACKGROUND OF THE INVENTION

1. Field of The Invention

The present invention relates to an image display apparatus of high resolution imaging which is provided with a pixel displacement unit which carries out optical displacement of the pixels of the imaging elements, such as those in a spatial optical modulator or a spatial light discharge unit, for each of two or more sub-fields of the image field. More specifically, the present invention relates to a projection image display apparatus of high resolution imaging which is applicable to a front or rear projector which projects a real image on the screen, and a head-mounted display or a view finder which projects a virtual image on the screen.

2. Description of The Related Art

Japanese Laid-Open Patent Application No. 04-113308 (Japanese Patent No. 293926), Japanese Laid-Open Patent Application No. 05-289044, Japanese Laid-Open Patent Application No. 09-152572, Japanese Laid-Open Patent Application No. 06-324320, and Japanese Laid-Open Patent Application No. 2000-98968 disclose a projection image display method which is made to carry out the optical displacement of the image of the spatial optical modulator (for example, the liquid crystal unit) optically for every sub-field, and projects the image at a resolution higher than the resolution of the spatial optical modulator.

The conventional image display devices of the above documents can obtain the twice (or 4 times) as many pixel, i.e., twice (or 4 times) as many resolution as the, as the respectively on the screen by carrying out displacement of the pixel optically by optical-axis shift to the two locations (or location of four every direction) perpendicular to the scanning line, and making the sub-field corresponding to the displacement into the two sheets or the four sheets.

Moreover, Japanese Laid-Open Patent Application No. 08-194207, Japanese Laid-Open Patent Application No. 09-230329, and Japanese Laid-Open Patent Application No. 09-015548 disclose an image display method which controls the amount of the optical displacement of the arrangement of the pixels and the optical-axis shift and the displacement direction thereof. The conventional image display devices of the above documents improve 3 times the resolution of the modulator by making the displacement of the three locations carry out in the same direction, and on the other hand, putting spatially, the RGB pixels which are produced by the spatial separation with the filters.

By performing the optical displacement, the delta arrangement of RGB is realized, or only some pixels indicated only in the specific portion are displaced, and the image display device which performs high-resolution imaging is also disclosed.

Japanese Laid-Open Patent Application No. 04-113308 discloses the spatial optical modulator in which the pixel size is smaller than the pixel pitch by one half. When the high-resolution imaging is performed by using the modulator and the optical-axis shift unit, the projection image-forming device of high resolution imaging which does not produce the lap between the adjoining pixels is also disclosed.

However, the pixel configuration is mainly determined in the aperture configuration of the spatial optical modulator, and since the permeability in the aperture is uniform, the optical intensity cross section which the contour configuration of the pixel in the field containing the pixel is usually the square, and is the beam profile (pixel profile) has the pixel profile which has the rectangle configuration which has the big step with the edge of the aperture.

For the reason, the gradation of edge of the image including one or more continuous pixels in the spatial optical modulator turns into a large spatial-frequency modulation, and the "resolution" measured by the optical intensity distribution of the line and space in the maximum spatial frequency of the pixel unit, and the "sharpness" by viewing become good. However, as the evaluation by viewing, the "hardness", the "jaggies", and the "image discontinuity" of the image become conspicuous. The problem corresponds to the disadvantage of the image of the liquid crystal over the image of CRT.

The pixel profile of CRT is the pixel profile that is similar to the Gaussian distribution form, and is a smooth image in which the "hardness", the "jaggies", and the "image discontinuity" are not conspicuous as the visibility. The "gradation discontinuity" stops simultaneously, being conspicuous as the results.

However, the "resolution" and the "sharpness" are not so good for the number of the pixels or on the basis of the number of the pixels.

On the other hand, the contour configuration of the pixel of the liquid crystal display which is the flat panel is the rectangle, and the pixel profile is the rectangle configuration.

For the reason, "resolution" and the "sharpness" are the images in which the "hardness", the "jaggies", and "image discontinuity" are conspicuous to being good on the basis of the number of the pixels, or the number of the pixels.

For the reason, even if it is monochrome character of binary data, the processing which performs the high gradation display which used gray scale about the "edge" portion, and stops being conspicuous in the "hardness", the "jaggies", and "image discontinuity" with the software processing to the font image may be made.

In the case of the conventional data projector of low resolution of SVGA or XGA class, the amounts of information of the one screen itself run short from the first for low resolution.

The number of the dots which forms the one character will be in the few state, in the case, it may become the impression which faded when the edge is not sharp, the distinction nature of the character may get worse, the visibility may tend to deteriorate, and the "hardness" as the visibility, the "jaggies", "image discontinuity", and "gradation discontinuity" may be conversely desirable.

However, in the low resolution about VGA, in the case of the projector of the object for the images of the case of the projector for the images, and the high resolution more than UXGA, and both for data, it sets.

It becomes important to consider the environment more by energy saving at the same time unlike the conventional projector for data of low resolution the request to the image quality is becoming enough as an amount of information of the one screen, realizes "the smoothness of the field and the edge" of the image by the high resolution on it, improves the visibility, improves the observer's recognition rate, reduces the rate of the error and reduces fatigue of the observer.

For the reason, the multiplication effectiveness according using the optical-axis shift unit to the one the twice of the original liquid crystal light valve, and further 3 times the number of the scanning lines of the, and the data linear density.

For example, consideration is given to performing the 4-fold high-resolution imaging or the 9-fold one for the number of the pixels. When the 4-fold high-resolution imaging is performed and pixel reduction is carried out to 50% or less of the conventional rates of the linear aperture (or the usual rate of the area-aperture is 25% of the 2's power), the pixel configuration of the projection image of projecting the reduced pixel with the projection lens is difficult to realize the "smoothness of the field and the edge" which is demanded in the case of the high resolution, unlike the case of the conventional projector of low resolution.

It is the projection lens, when the conventional pixel of the spatial optical modulator whose optical intensity the contour configuration is the square configuration and is the rectangle configuration is projected and projector equipment is produced.

Although the beam profile of the rectangle configuration is changed and it becomes the pixel on the screen according to the MTF frequency characteristic of the projection lens at the same time the square pixel is expanded on the screen for the predetermined magnification, it is changed so that it may have curvature with the usually big edge of the ends of the rectangle configuration.

Although the resolution of the projection lens for data projections differs greatly also with the kind of the image information, and the product price strap, in order to usually harness the resolution of the liquid crystal light valve in high cost effectively relatively, 30% or more is required for MTF in the highest spatial frequency which the pitch of the pixel gives, and it is 50% or more preferably.

If the projection lens is MTF 100% in all spatial frequencies at the time, since the image in the liquid crystal light valve and the expansion image on the screen have the relation of 1:1 completely, the pixel profile is the rectangle configuration and the "hardness" as the visibility, the "jaggies", and "image discontinuity" are the very conspicuous images like the LCD monitor as a usual flat display.

Actually, since MTF of the projection lens is not completely 100% in the entire spatial frequencies, corresponding to approaching the sine-wave-pixel profile simply, image quality can receive the deformation, and the beam profile of the rectangle configuration of the pixel can reduce the "hardness", the "jaggies", the "image discontinuity", etc.

However, even if it projects the reduced pixel of 50% or less of the conventional rates of the linear aperture with the projection lens of comparatively low MTF and forms the projection image, the rate of the aperture is small, and there is the space between the adjoining pixels when MTF of the projection lens is dropped to the state where the "hardness", the "jaggies", the "image discontinuity", etc. are not conspicuous. The resolution of the image also deteriorates simultaneously, and the "sharpness" of the image is reduced.

When MTF of the projection lens becomes still smaller than 30%, the inclination becomes still larger, improvement in the image quality when performing high-resolution imaging by carrying out the optical-axis shift in the case is almost lost, and it becomes impossible to display only the deteriorated image instead.

This is the case when the focus location of the projection lens is shifted and the focal location is removed. As the pixel profile which has performed pixel reduction simply by making the rate of the aperture into 50% or less of rates of the linear aperture, the pixel profile which decreases the "hardness", the "jaggies", "image discontinuity", etc. is unsuitable in the case of high-resolution imaging.

Japanese Laid-Open Patent Application No. 09-054554 discloses that, when carrying out the optical-axis shift and performing high-resolution imaging, the above-mentioned method of focusing with the focusing lens smaller than the comparatively large aperture of the penetrated type liquid crystal panel FIG. 16, FIG. 17A, and FIG. 17B show an example of the conventional image display apparatus which combines the penetrated type micro lens to the penetrated type liquid crystal panel as the means for changing the pixel size, which is disclosed in Japanese Laid-Open Patent Application No. 09-054554.

FIG. 16 shows the example of the micro lens which has the penetrated type liquid crystal light-valve with the specific aperture, and the circular contour which reduces pixel size rather than the small aperture which is restrained and produced by the active unit.

FIG. 17A and FIG. 17B show the state of the continuation pixel profile which is formed when the optical-axis shift of the pixel profile of the rectangle configuration having the pixel reduced by the composition of FIG. 16 is carried out.

In FIG. 16, reference numeral 101 is the incident-light ray, 102 is the focusing optical system, 102a is the minute lens, 103 is the indicating element, 103a is the opening of the pixel which is provided in the indicating element 103, 101a is the picture element which is formed with the focused light ray, and 104 is the outgoing ray.

The incoming ray 101 which is incident to the opening 103a of the pixel of the indicating element 103 is focused by the minute lens 102 in the focusing optical system 102, and the focusing pixel 101a is incident to the opening 103a and passes through it.

The ray which comes out from the opening 103a after this penetration turns into the outgoing beam 104.

FIG. 17A shows the state of the continuation pixel profile formed when the optical-axis shift is performed without reducing the pixel size.

FIG. 17B shows the state of the continuation pixel profile formed when the optical-axis shift is performed when reducing the conventional pixel shown in FIG. 16.

Both the states of FIG. 17A and FIG. 17B are shown to explain the operation of the projection expansion apparatus using the penetrated type liquid crystal light valve and the optical-axis shift unit when performing the high-resolution imaging that is the 2-fold one in one direction.

As shown in FIG. 17A, when not carrying out pixel reduction, the pixel is slightly reduced by the aperture with the less than 100% area opening factor determined by the arrangement of the active unit (not shown) prepared in the pixel.

Even if the pixel profile in the case is the rectangle configuration limited by the aperture and uniform lighting high-resolution it by optical-axis shift using such a pixel profile. While the resolution is not improved in spite of the optical intensity of these overlapping portions having increased in step and having used the optical-axis shift when the pixel profiles of the shifted rectangle configuration overlapped, there is the problem that the "discontinuity" of the image will be conspicuous.

When pixel reduction is carried out, the width of face of the pixel profile of the rectangle configuration is made into 50% or less of the pixel pitch, and the lap between the adjoining pixel profiles is lost, but the resolution is improved as shown in FIG. 17B.

However, similar to the case of Japanese Laid-Open Patent Application No. 04-113308, the pixel profile shown in FIG. 17B is the pixel profile of the rectangle configuration in which the rate of the linear aperture is 50% or less. The "sharpness" as the visibility and the "resolution" are good, but the "hardness", the "jaggies", and the "image discontinuity" are conspicuous like the LCD monitor as a usual flat display.

Although the can be reduced by changing the MTF characteristics of the projection lens, the "resolution" and the "sharpness" will deteriorate conversely.

For the reason, as the image projector of high resolution which realizes high-resolution imaging, or a data projector of high resolution, the projection image which secures the "sharpness" which is demanded, unlike the case of the conventional projector of low resolution, taking advantage of the high resolution imaging by increase of the number of the pixels in the case of the high resolution imaging, and the "smoothness of the field and the edge" cannot be realized by shifting the pixel profile using the optical-axis shift unit.

Such a problem cannot be resolved if the pixel profile of the projection image having the pixel size reduced is in the rectangle configuration even when the contour configuration of the pixel is changed to the circular configuration with the focusing optical system as shown in FIG. 16. It is difficult to achieve the purpose of high-resolution by increase of the number of the pixels using the optical-axis shift unit.

Furthermore, in the case of Japanese Laid-Open Patent Application No. 04-113308, the pixel size is reduced, but it is materialized only on the assumption that the beam profile of the rectangle configuration for which pixel reduction of 50% or less of rates of the linear aperture is needed in order for the pixel profile not to lap, and the description about the pixel profiles other than the rectangle configuration is not accepted at all, but is produced by the pixel profile of the rectangle configuration.

On the other hand, in the case of Japanese Laid-Open Patent Application No. 09-054554, it is indicated that the brightness level, i.e., the optical intensity, is improved and the contrast is improved, since the average luminance per 1-pixel area does not improve even if peak luminance improves, except that the rate of the effective aperture of the pixel by reducing the pixel improves, there cannot be no improvement in optical use efficiency.

Generally, the luminance of the case is reduced by the same or loss by the added optic on the basis of the area of the original pixel.

Furthermore, the case of Japanese Laid-Open Patent Application No. 09-054554 is premised on the rectangle configuration as a pixel profile of the reduced pixel, as shown in FIG. 17B.

For the reason, when improving and doubling the resolution in one direction using the optical-axis shift unit, in order for the pixel by which the optical-axis shift is carried out not to lap like FIG. 17A, it is necessary that the pixel reduction is at least 50% or less of the rate of the linear aperture.

For the reason, the F value of the reflection light ray is increased almost two times the F value of the incident light determined by the lighting optical system, and a very bright lens as the projection lens is required.

On the contrary, if the projection lens of the optimal F value is used when not carrying out pixel reduction, the reflection of the projection lens will arise and it will become 25-50% of very low optical use efficiency as compared with the case where pixel reduction is not carried out.

Moreover, the case where the F value of the reflection light becomes brighter than 2 double part by many yields of the optical system used for pixel reduction arises.

Under the influence, the F value (it is the ½ twice as many projection lens as the at the F value) of the brightness of 2 twice is used at the angle of the outgoing beam, but the optical use efficiency will decrease. For the reason, when carrying out pixel reduction, the improvement in optical use efficiency is a very important problem. However, there is no teaching in Japanese Laid-Open Patent Application No. 09-054554 as to how to solve the above-mentioned problem.

SUMMARY OF THE INVENTION

An object of the present invention is to provide an improved image display apparatus in which the above-described problems are eliminated.

Another object of the present invention is to provide an image display apparatus in which the optical-axis shift unit is used to increase the number of pixels and aim at the high resolution imaging, which secures the resolution and the sharpness of the projection image and realizes the smoothness of the field and edge by reducing the hardness, the jaggies and the image discontinuity as in the conventional image display apparatus.

Another object of the present invention is to provide an image display apparatus in which the optical-axis shift unit is used to increase the number of pixels and aim at the high resolution imaging, which effectively increases the efficiency of use of the light.

The above-mentioned objects of the present invention are achieved by a projection image display apparatus comprising: an indicating element which modulates or emits light as a pixel in accordance with image information; a displacement unit which optically displaces a position of the pixel for each of two or more sub-fields constituting an image field corresponding to the image information; a projection unit which enlarges the pixel and projects an enlarged pixel on a screen; and a pixel-profile deformation unit which deforms an optical intensity profile of the pixel.

The above-mentioned objects of the present invention are achieved by an image display apparatus comprising: a light source which emits light; an irradiation optical element which converts the light from the light source into an irradiation beam; a plurality of optical modulators arranged on a flat surface, the plurality of optical modulators optically modulating the irradiation beam incident to the optical modulators, and each optical modulator reflecting the irradiation beam to output a reflected beam; a light-path modulation unit modulating a light path of the reflected beam from the plurality of optical modulators in space coordinates; and a reflection-type beam profile deformation unit, provided in each of the plurality of optical modulators, which deforms a beam profile of the reflected beam output from each optical modulator.

According to the present invention, the relative optical intensity near the edge of the pixel can be decreased according to the pixel profile of the non-rectangle configuration, the influence of the lap between the contiguity pixels when carrying out the optical-axis shift is reduced, and it is possible to provide an image display apparatus which realizes the "sharpness" of the image and the "smoothness of the field and the edge" simultaneously.

Moreover, the angle of the outgoing light ray can be reduced by increasing the relative value to the pixel pitch for the full width at half maximum of the pixel profile, and the reflection of the outgoing light ray can be reduced with the projection lens. Therefore, it is possible to realize the image display apparatus which effectively increases the efficiency of use of the light.

In the image display apparatus of the present invention, securing the "resolution" and the "sharpness" is possible, and reducing the "hardness", the "jaggies", and the "image discontinuity" is possible. Thus, the "smoothness of the field and the edge" is realized and, according to the present invention, the bright projection image display apparatus which effectively increases the efficiency of use of the light.

BRIEF DESCRIPTION OF THE DRAWINGS

Other objects, features and advantages of the present invention will be apparent from the following detailed description when read in conjunction with the accompanying drawings.

FIG. 22A through FIG. 22G are diagrams for explaining the operation which projects on the screen the reduced pixel which is reflected from the reflective concave mirror by the reflection-type light valve.

DETAILED DESCRIPTION OF PREFERRED EMBODIMENTS

A description will now be provided of the preferred embodiments of the present invention with reference to the accompanying drawings.

Figure 1:
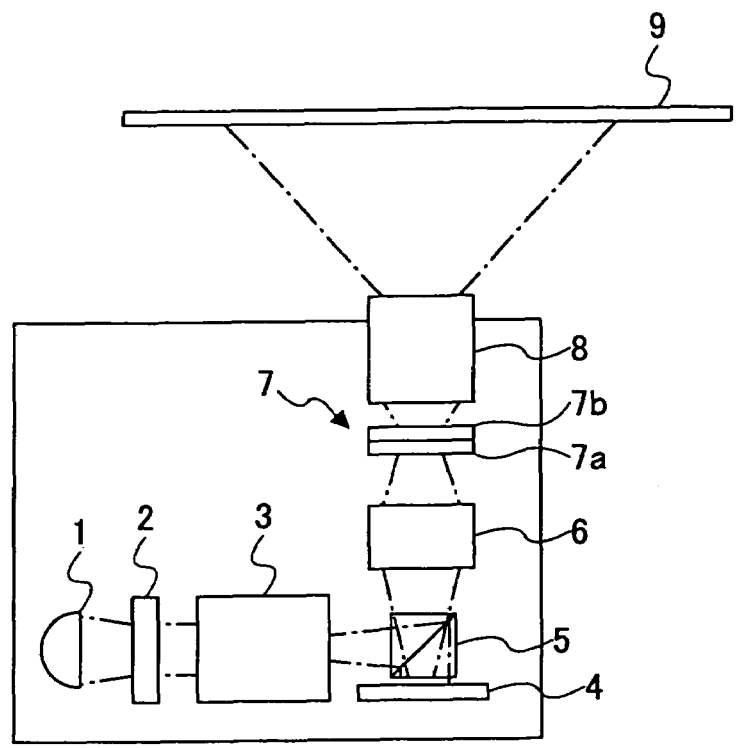
FIG. 1 is a diagram showing the projection image display apparatus according to one embodiment of the present invention.
Figure 2:
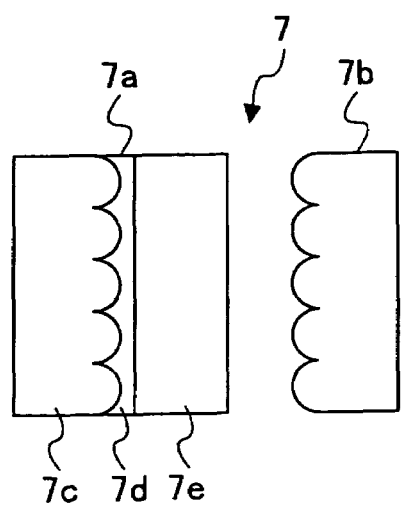
FIG. 2 is a diagram showing an example of the pixel reduction unit in the projection image display apparatus of FIG. 1.

FIG. 1 and FIG. 2 show a projection image display apparatus according to the embodiment 1 of the present invention.

Specifically, FIG. 1 shows the projection image display apparatus of the embodiment and FIG. 2 shows an example of the pixel reduction unit.

In FIG. 1, reference numeral 1 is a white light source including a high-pressure mercury lamp with the reflector, 2 is an optical integrator, such as the fly eye lens, 3 is a color separation unit, such as a color wheel, 4 is a spatial optical modulator, 5 is a polarization beam splitter (PBS), 6 is a macro lens, 7 is a pixel-profile deformation unit including a first micro-lens array 7a and a second micro-lens array 7b, 8 is a projection lens, and 9 is a screen.

Although not illustrated in FIG. 1, an optical-axis shift unit is provided in the projection lens 8 at the side of the pixel-profile deformation unit, the optical-axis shift unit using the liquid crystal cell having the perpendicular orientation of the ferrodielectric liquid crystal.

In FIG. 1, as for the intensity of the light coming out of the white light source 1 is equalized by the optical integrator 2, such as the fly eye lens. The optical integrator 2 may be constituted by two fly eye lenses and a condenser lens.

Alternatively, the polarization beam splitter (PBS) array for polarization conversion may be provided.

The color separation unit 3, such as the color wheel, separates the incident light into three colors of red, green, and blue.

When the color wheel is used, it does not separate the incident light into red, green, and blue simultaneously, but it separates the incident light into red, green, and blue sequentially.

The light goes into the polarization beam splitter 5, and it is reflected by the pixel of the spatial optical modulator 4, and the light separated for every color passes the polarization beam splitter 5, and goes into the micro lens 6.

In the micro lens 6, a middle image of the pixel is formed on the surface of the first micro-lens array 7a. The first micro-lens array 7a acts as the field lens. The image profile of the middle image is deformed by the second micro-lens array 7b, and it is projected on the screen 9 by the projection lens 8. The projection image is formed by the pixel profile by which the high precision image is deformed into the screen 9.

In the embodiment, in the projection lens 8, the thickness of the liquid crystal layer is about 100 micrometers. Two sets of optical-axis shift units are used for the liquid crystal cell having the perpendicular orientation of the ferrodielectric liquid crystal of the optical-axis shift unit (not shown). The half-wave plate is provided in the middle of the 2 sets of the optical-axis shift units, and it considered as the optical-axis shift means in which the optical-axis shift of 4 displacements of the horizontal direction 2 steps and the perpendicular direction 2 steps is possible.

Since the electrode needed to apply the electric field to the substrate transverse direction, the dielectric thick-film layer and the strip-like electrode thereon are formed. Then, high voltage of 1 to 4 kV is applied to the ends of the electrode. By the configuration, the optical-axis shift amounting to 5-10 micrometers in one direction is possible.

In order to realize the high-speed response as the spatial optical modulator 4 which is the indicating element, shifting the optical axis for every sub-field is performed so that the image can be displayed, and the LCOS (liquid crystal on silicon) of ferrodielectric liquid crystal is used.

The pixel pitch of the spatial optical modulator 4 is 13.2 micrometers. The micro lens 6 adjusts the imaging location relation so that the pixel pitch of 13.2 micrometers is suited for the micro-lens pitch of 14.0 micrometers of the micro lenses 7a and 7b of the pixel-profile deformation unit 7.

The imaging location relation is adjusted so that the pitch of LCOS and the pitch of 14.0 micrometers of the micro lenses 7a and 7b of the pixel-profile deformation unit 7 may be in agreement.

As the spatial optical modulator 4, the penetrated type liquid crystal LV or the DMD (from Digital Instrument Co.) which uses elevated-temperature polycrystal silicone in addition to the LCOS can also be used. However, when using the DMD, the polarization beam splitter 5 becomes unnecessary.

Moreover, the F value of the projection lens 8 is set to 2.4, and the F value of the micro lens 6 is set to 4.0.

The pixel-profile deformation unit 7 as the pixel-profile deformation unit in FIG. 1 is shown in FIG. 2. As shown in FIG. 2, the pixel-profile deformation unit 7 is formed by two sheets of the first micro-lens array 7a and the second micro-lens array 7b. As the focal distance of the first micro-lens array 7a could be large, in order that the power of the micro lens is made small, the pixel-profile deformation unit 7 is formed by the lamination type micro lens by the resin embedding. It is desirable that the focal distance of the second micro-lens 7b is small, and the second micro-lens array 7b is taken as the air interface micro lens.

The adjustment of the first micro-lens array 7a and the second micro-lens array 7b is performed by using the 6-axis stage (the direction of the optical axis: z, the two directions perpendicular to the optical axis: x, y, and the three rotation directions about the x, y, z-axis) for each of the micro-lens arrays 7a and 7b.

The lamination type first micro-lens array 7a shown in FIG. 2 includes the micro-lens array 7c, the adhesive 7d, and the transparent covering member 7e. The material of the micro-lens array 7c and the covering member 7e used is glass.

More specifically, the pixel reduction unit by the micro lens of FIG. 2 in the convex configuration micro lens is produced by dry etching of a neoseram substrate (or a crystallization transparent glass of Nippon Electric Glass Co.) according to the resist transferring method. It is combined with another neoseram substrate by using the UV photoresist adhesive (Kyoritu Kagaku Co., #7702) of a low index of refraction. The adhesion hardening is carried out by the UV irradiation. The lamination type first micro-lens array 7a is produced in the manner.

The material is not limited to the above example, and any material may be used if the index of refraction, the etching characteristics, and the thermal expansion coefficient are appropriately selected.

The expansion imaging of the projection pixel in the sub-field observed on the screen 9 of the projection image equipment shown in FIG. 1 is carried out with the projection lens 8 in the pixel which has the pixel profile by which the pixel-profile deformation unit 7 shown in FIG. 2 is changed.

In the embodiment, by controlling appropriately the relative positions of the first micro-lens array 7a, the LCOS (the spatial optical modulator 4) and the micro lens 6, the focal distance thereof, and the relative position and the focal distance of the second micro-lens array 7b to the first micro-lens array 7a, the relative optical intensity near the edge of the pixel can be decreased by deforming the pixel profile into a non-rectangular configuration that is different from the conventional rectangle configuration.

Accordingly, it is possible to provide a projection image display apparatus in which the influence of the lap between the contiguity pixels when carrying out the optical-axis shift is reduced, and the "sharpness" of the image and the "smoothness of the field and the edge" are simultaneously realized.

Since the angle of the reflection light ray can be reduced by making the half-width of the pixel profile to the pixel pitch larger than the case of the profile of the conventional rectangle configuration, the reflection of the outgoing light ray by the projection lens 8 is reduced, and the projection image display apparatus which effectively increase the efficiency of use of the light can be realized.

The reduction of the outgoing beam angle is equivalent to the efficiency of the lighting area when considering as the pixel unit corresponding to the portion which weakens the grade of the efficiency pixel reduction having become large, and is based on the increase of the lighting include angle which is made into the pixel unit for the reason having been controlled.

By the ability decreasing the relative optical intensity near the edge of the pixel, the influence of the lap between the contiguity pixels when carrying out the optical-axis shift can be reduced, and the "sharpness" of the image and the "smoothness of the field and the edge" can be realized simultaneously. A detailed description of the matter will be given in the following.

If the projection lens of a high MTF is used when forming the projection image which projected the pixel which has the pixel profile of the rectangle configuration like LCOS with the projection lens.

Although the high resolution can be realized and the good "sharpness" can be realized by the projection pixel which has the projection pixel profile of the abbreviation rectangle configuration corresponding to the original pixel, they are the "hardness", the "jaggies", and the image in which "image discontinuity" is conspicuous and the "smoothness of the field and the edge" has deteriorated.

On the contrary, the projection lens of low MTF may be used, or the focus point of the projection lens of high MTF may be removed.

Although the "hardness", the "jaggies", and "the smoothness of the field and the edge" that reduced "image discontinuity" can realize the good image by the projection pixel which has the projection pixel profile as having given curvature to the edge portion and flat portion of the rectangle configuration without making it correspond to the pixel profile of the original pixel, only the projection image which "resolution" deteriorated as the and a trade-off and the "sharpness" reduced is unrealizable.

Since the optical intensity of the outgoing beam of the edge portion of the pixel of the is the same as that of a part for the center section of the pixel, it is for spreading widely to the range of the contiguity pixel corresponding to the point image function which has spread comparatively greatly corresponding to the projection lens of low MTF.

The spread of the outgoing beam to the contiguity pixel in the case is not necessarily limited to one pixel of the nearest neighbors, and spreads the nearest-neighbors pixel in one pixel, the 2nd pixel set the 2 pixels, or the 3rd pixel or more.

According to this embodiment, by providing the optical element 7, the pixel profile of the rectangle configuration of the LCOS (spatial optical modulator 4) is deformed per pixel. Since the pixel profile is changed into a non-rectangle configuration, the pixel which has the resulting pixel profile is projected with the suitable projection lens 8 of MTF so that the projection image is formed on the screen.

The influence of the outgoing beam of the edge portion of the pixel which has the same optical intensity as a part for the center section of the pixel can be reduced in this embodiment.

Accordingly, the relative optical intensity near the edge of the pixel can be decreased according to the pixel profile of the non-rectangle configuration, the influence of the lap between the contiguity pixels when carrying out the optical-axis shift is reduced, and it is possible to provide an image display apparatus which realizes the "sharpness" of the image and the "smoothness of the field and the edge" simultaneously.

Moreover, the angle of the outgoing light ray can be reduced by increasing the relative value to the pixel pitch for the full width at half maximum of the pixel profile, and the reflection of the outgoing light ray can be reduced with the projection lens. Therefore, it is possible to realize the image display apparatus which effectively increases the efficiency of use of the light.

The influence of the outgoing beam near the edge of the pixel which spreads to the pixel which adjoined based on the point spread function of the projection lens 8 can be reduced by the deformation of the pixel profile by the optical element 7 (the pixel-profile deformation unit), which more specifically prepared the relative optical intensity near the edge of the pixel.

Furthermore, the deformation of the pixel profile by the pixel-profile deformation unit 7 for every pixel of the image differs from the pixel profile of the rectangle configuration receiving the deformation with the projection lens 8.

This depends on the ability to decrease greatly spreading the nearest-neighbors pixel in one pixel, the 2nd pixel set the 2 pixels, or the 3rd pixel or more, since the optical action is carried out for the deformation of the pixel profile per pixel by the optical element of the pixel unit although the pixel which carried out the nearest neighbors is affected some and the optical action is the pixel unit therefore.

For the reason, cross talk with the contiguity pixel can be reduced greatly.

Moreover, since the influence of the outgoing beam of the edge of the pixel is reduced to the pixel when the rate of the straight-line aperture is larger than 50% and the relative value of the half-width of the pixel profile to pixel pitch is 70% or less, high "resolution" and the good "sharpness" are realizable.

This can mean that it is seldom necessary to reduce the pixel, and only the part which is equivalent to at the rate and has reduced the spread of the outgoing beam can raise optical use efficiency.

The relative value of the half-width of the pixel profile to the pixel pitch in the case is 70% or less preferably, and is 60% or less more preferably.

Moreover, in the projection image display apparatus which prepared and high resolution the optical-axis shift unit which shows the pixel which deformed the pixel profile into the non-rectangle configuration (configuration which is not the rectangle configuration) to FIG. 1 by the pixel-profile deformation unit 7 shown in FIG. 2, when it projects on the screen 9 with the projection lens 8, the pixel profile of the projection pixel is also projected in the non-rectangle configuration.

When the relative value of the half-width of the projection pixel profile as opposed to projection pixel pitch to the projection pixel which has the pixel profile of the non-rectangle configuration is 70% or less at the time, the reduction of the "hardness", the "jaggies", and the projection image in which "the smoothness of the field and the edge" which reduced "image discontinuity" has the good image of realization of the good image and the "sharpness" with high "resolution" is completed like the case of the pixel before the original projection.

Figure 3:
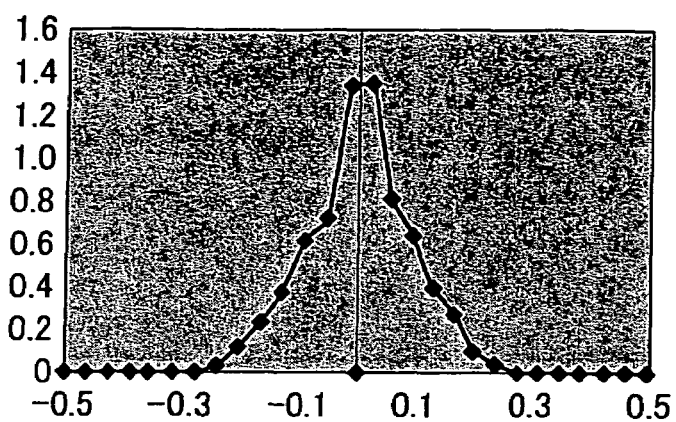
FIG. 3 is a diagram for explaining the characteristics of an example of the projection pixel profile of the non-rectangle configuration.

FIG. 3 shows an example of the projection pixel profile of the projection pixel of the image of the non-rectangle configuration displayed in the projection image display apparatus shown in FIG. 1 and FIG. 2.

In FIG. 3, the horizontal axis is made into the relative position on the screen, the axis of ordinate is made into relative optical intensity, it is equivalent to the die length whose nine points the horizontal axis is mm unit and are one pixel, and the axis of ordinate is the arbitrary unit.

As shown in FIG. 3, unlike the conventional projection pixel, the "hardness", the "jaggies", and the "image discontinuity" of the projection image can be reduced, and good "smoothness of the field and the edge" and good "sharpness" can be achieved with high "resolution" according to the present embodiment.

The pixel profile of the projection pixel which is deformed by the pixel-profile deformation unit 7 is measured by the method of projecting on CCD provided on the screen 9 by using the projection lens 8.

Moreover, it is deformed by the pixel-profile deformation unit 7, and the pixel profile itself is measured simultaneously.

On the occasion of the measurement, the microscope has been arranged instead of the projection lens 8, and it is measured by the method of carrying out incidence to CCD prepared in the imaging side of the microscope.

At the time, the pixel profile measured under the microscope evaluated NA of the projection lens 8, and NA of the microscope object lens by the same appearance elevation by making it in agreement optically.

Moreover, the MTF of the projection lens 8 changes with image quantities, and the evaluation on the optical axis is mainly performed.

Actually, it is desirable to combine the MTF of the projection lens 8 with the required pixel profile deformation, and design and evaluate the influences of image quantity optimally.

Figure 4:
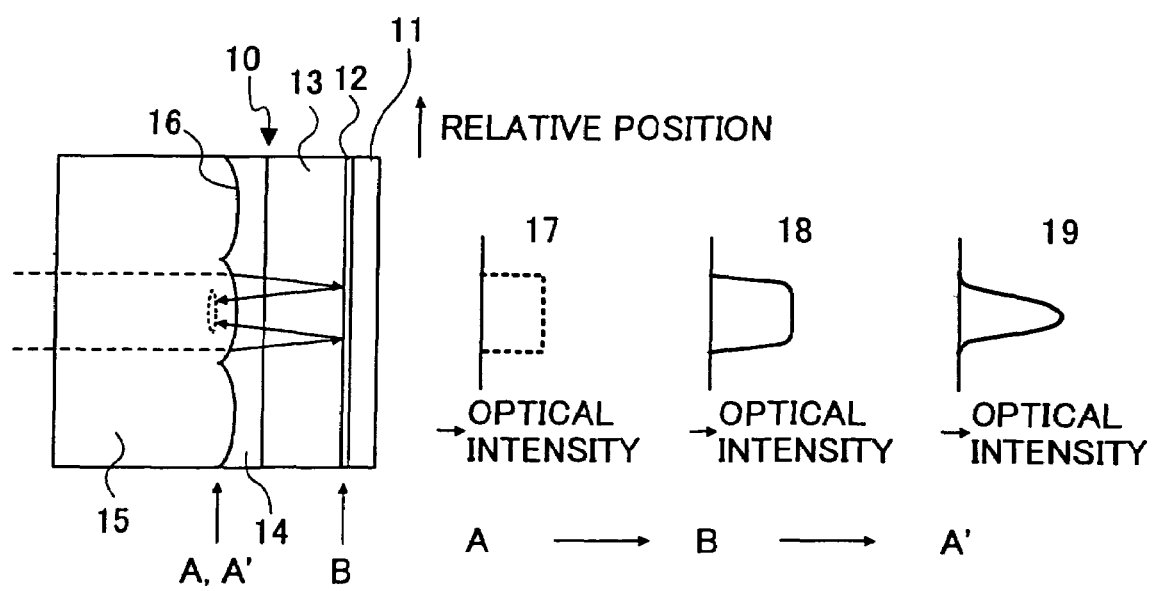
FIG. 4 is a diagram showing a pixel-profile deformation unit of one embodiment of the present invention.

FIG. 4 shows the composition of the embodiment 2 which united the pixel-profile deformation unit 10 of the present invention with LCOS.

In FIG. 4, reference numeral 11 is the silicon substrate, 12 is the liquid crystal layer, 13 is the middle substrate, 14 is the adhesive layer, 15 is the micro-lens substrate, 16 is the convex configuration formed on the micro lens substrate, and 17, 18 and 19 are the optical intensity distributions of the light ray which is equivalent to the pixel profile at the locations A, B and A' as indicated in FIG. 4.

In FIG. 4, it is the back plain of LCOS, and the active unit and reflector by CMOS are formed in the silicon substrate 11 for every pixel, and the reflection-type spatial optical modulation in the pixel unit can be performed to it using the polarization lighting light and polarization separation means by the liquid crystal layer 12 by impressing the electric field to the liquid crystal layer 12 included by the middle substrate 13 which has prepared ITO (not shown).

Moreover, by sticking the convex configuration 16 formed in the micro-lens substrate 15 with the middle substrate 13 using the adhesives layer 14, the lamination type micro lens is formed for every pixel, and the micro lens and the reflector formed on the silicon substrate 11 constitute the pixel-profile deformation unit 10.

In the location A which is the location which carried out incidence to the pixel-profile deformation unit 10, since the incoming ray which are the polarization lighting light shown by the dotted line which carried out incidence from the left-hand side of FIG. 4 are beforehand made uniform lighting, they have the pixel profile of the rectangle configuration.

Then, in the location B which is the location which passed the pixel-profile deformation unit 10 and carried out incidence to the mirror plane of the silicon substrate 11, it becomes the pixel-profile configuration where the pixel profile of the original rectangle configuration is deformed into some, and is rounded.

In the location A' which is the location which it is reflected by the mirror plane of the silicon substrate 11, and carried out incidence to the pixel-profile deformation unit 10 again, relative optical intensity of the surrounding edge of the pixel can be made small, and the full width at half maximum (or the half-width) at that time deforms into the pixel profile which becomes smaller than the half life width of the original drawing pixel.

The pixel profile changes with the locations of the direction of the optical axis in accordance with the light ray corresponding to the pixel which has passed through the pixel-profile deformation unit 10 and is converted to the reflection light ray as the outgoing light ray.

The projection pixel on which the pixel which has the pixel profile which is not the rectangle configuration is made to project can be obtained by arranging in the imaging-related location where LCOS and the screen 9 of FIG. 4 which exchanged LCOS united with the pixel-profile deformation unit 10 for LCOS of the embodiment 1 shown in FIG. 1, abbreviated the pixel-profile deformation unit 7 to the micro lens 6, and exchanged the projection lens 8 serve as the conjugate.

Accordingly, it is possible to provide an image display apparatus which realizes the "sharpness" of the image and the "smoothness of the field and the edge" simultaneously with the reduction of the "hardness", the "jaggies", and the "image discontinuity", similar to the embodiment 1 of FIG. 1.

Moreover, the angle of the outgoing light ray can be reduced by increasing the relative value to the pixel pitch for the full width at half maximum of the pixel profile, and the reflection of the outgoing light ray can be reduced with the projection lens. Therefore, it is possible to realize the image display apparatus which effectively increases the efficiency of use of the light.

Figure 5A:
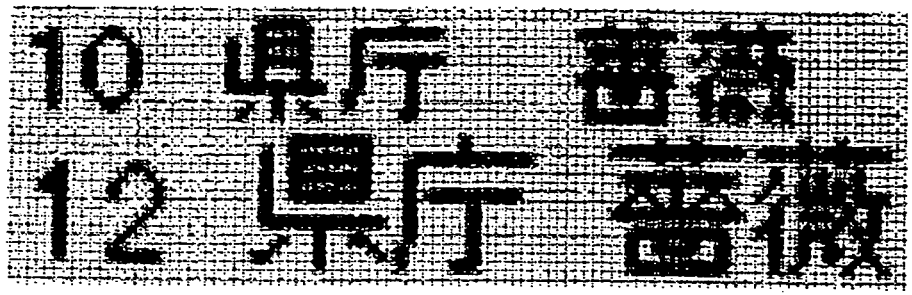
FIG. 5A, FIG. 5B, and FIG. 5C are diagrams showing the evaluation results of one embodiment of the present invention and some comparative examples.

FIG. 5A shows an example of the result calculated using the optical-design evaluation tool about the projection image including the projection pixel on the screen 9 when using the pixel-profile deformation unit 7 in the composition of the embodiment 1 which showed the pixel-profile deformation unit of the present invention to FIG. 1 united with LCOS used as the embodiment 3 of the present invention.

The projection image which displayed the "kanji" character is shown, the lattice-like pattern of about 30 is made to the check lengthwise, the pitch corresponding to the one lattice is equivalent to the pixel pitch of the original LCOS, and FIG. 5A is by the pixel-profile deformation unit 7.

It is projected with the projection lens 8 and the imaging of the projection pixel is carried out to the screen 9 at the same time the optical-axis shift unit carries out displacement of the optical location by the time sharing, after this pixel profile is deformed.

In this embodiment, the field is compounded by the four sub-fields and the optical-axis shift unit is the optical-axis shift unit which performs the 4-fold high resolution imaging as much increase as the number of the pixels of 2×2.

As in the projection image on the screen 9 of FIG. 5A, the experimental model is manufactured in the composition as shown in FIG. 1, and while performing evaluation by the microscope and CCD which have been arranged instead of, calculation estimated the projection image including the projection pixel on the screen 9 using the optical-design evaluation tool.

The number of the light rays is made into about 200,000-500,000 using the light-tools (the 3.2th edition) of the U.S. Optical Research Associate Co. in which the non sequential ray-tracing analysis based on Monte Carlo method may be used as an optical-design evaluation tool (when a 1-GHz CPU is used it is the computational complexity for about 50-100 minutes).

In order to reduce the burden of calculation, the ray tracing is performed only about two or more pixels of the specific range, and calculated and evaluated the optical intensity distribution in the large range in the screen side by carrying out the convolution of the evaluation result obtained by the calculation evaluation tool of the separate its original work in the light-tools.

Moreover, although it has normalized so that the highest light intensity value may turn into the constant value, for the reason, the average is not necessarily fixed.

On the occasion of the modeling, the surface-integral cloth of the discharge light of the high-pressure mercury lamp and the include-angle distribution are also taken into consideration, and the high-pressure mercury lamp aimed at adjustment with the experimental value further based on the value of 150 W class DC discharge lamp of Ushio Co. (the arc length: 1.1-1.2 mm).

The projection lens used for and designed separately the cord 5 (the 8.6th edition) in which the sequential ray-tracing analysis of U.S. Optical Research Association Co. is possible besides the projection lens actually made as an experiment, and performed various evaluations.

Furthermore, the projection image by the experimental model is received in the image evaluation to the image on which it is projected.

The LCD and CRT which can display UXGA are used for the projection image evaluated using the optical-design evaluation tool at the same time it carries out directly. The 10×10 pixels to the 20×20 pixels are set to new one pixel.

The subjectivity evaluation is performed in the state corresponding to the resolution of 76-200 ppi to two or more observers, securing gradation nature and saving the pixel profile manufacturing as an image with the specific pixel profile, and changing the observation location.

As the numerical evaluation to the pixel profile immediately after deforming the pixel profile which becomes the origin of the pixel profile of the projection image, and its projection, it considers as the evaluation value mainly concerned with the CTF and the full width at half maximum (FWHM).

The full width at half maximum in the case of carrying out displacement of the optical location from the optical-axis shift unit to the pixel which deformed the pixel profile, and the definition of CTF are described below.

Figure 6A:
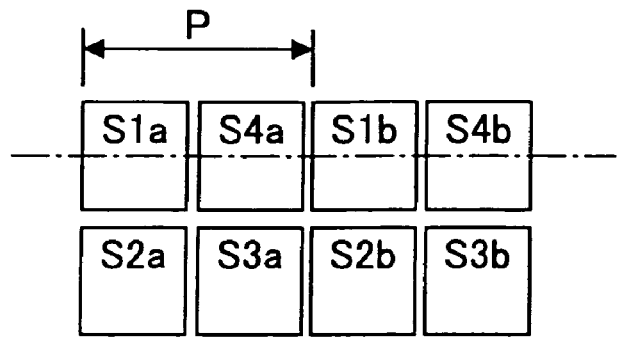
FIG. 6A and FIG. 6B are diagrams for explaining the half-width and the CTF according to the present invention.
Figure 6B:

FIG. 6A and FIG. 6B are diagrams for explaining the definition of the full width at half maximum.

In FIG. 6A, the pixel S1$a$ of the 1st sub-field and S1$b$ are the Ming displays (white display) among the 1st-the 4th sub-field S1-S4, and pixel S4$a$ of the 4th sub-field and S4$b$ are dark displays (black display).

FIG. 6B shows the cross section of the pixel profile, as indicated by the dotted chain line, which passes pixel S1$a$ to pixel S4$b$.

The full width at half maximum is expressed with the value (W/P) [%] standardized the pixel periodicity P with which the width of face W of the value of the half of pixel peak intensity is projected on all the sub-fields at the time.

Figure 7:
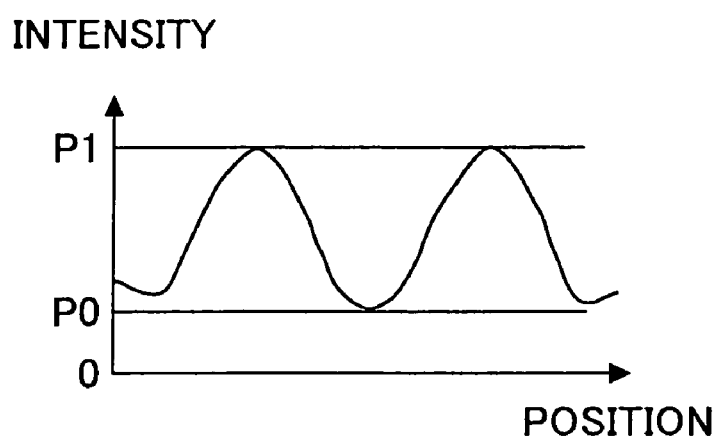
FIG. 7 is a drawing for explaining the definition of the CTF according to the present invention.

FIG. 7 is a diagram for explaining the definition of CTF according to the present invention.

The horizontal axis is the relative position of the direction perpendicular to the optical axis of the pixel or the projection pixel, and the axis of ordinate is the optical intensity of the pixel or the projection pixel.

As shown in FIG. 7, when the image input to the spatial optical modulator repeats white and black in the shape of a line, as for the pixel or the projection image, the black level comes floating.

If the maximum of projection image intensity is set to P1 and the minimum value is set to P0, the CTF (contrast transfer function) will be defined by the following formula (1).

$$CTF = (P1-P0)/(P1+P0) \times 100\% \quad (1)$$

This corresponds to MTF (modulation transfer function) which is the spatial transfer function, that the origin is the line & tooth space of the rectangle configuration by the spatial optical modulator differs from the actual spatial frequency and the frequency of the unit by the Fourier expansion.

Figure 8A:
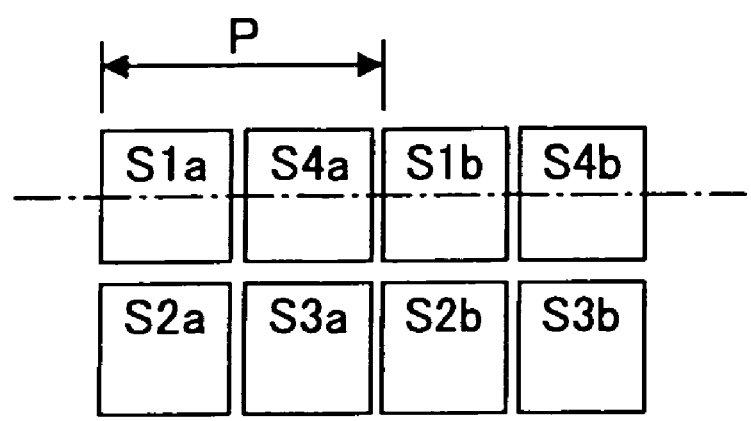
FIG. 8A and FIG. 8B are diagrams for explaining the definition of the CTF at the time of using the pixel-profile deformation unit and the optical-axis shift unit.
Figure 8B:
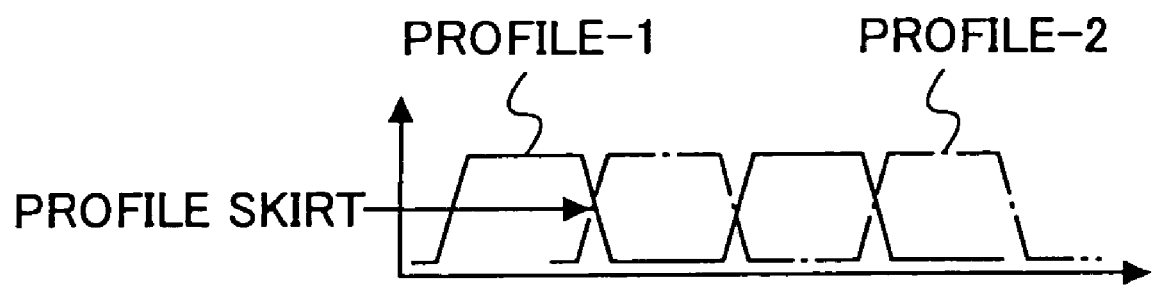

FIG. 8A and FIG. 8B are diagrams for explaining the definition of CTF when using the pixel-profile deformation unit and the optical-axis shift unit.

The profile 1 indicated by the solid line in FIG. 8B is the profile in case pixel S1$a$ of the 1st sub-field S1 and S1$b$ are the Ming displays, and the profiles 2 indicated by the dotted dash line in FIG. 8B are pixel S4$a$ of the 4th sub-field S4, and the profile of S4$b$.

The intensity of the portion (indicated by the arrow portion of FIG. 8B) which crosses pixel S4$a$ equivalent to the contiguity pixel of pixel S1$a$ is called "skirt intensity."

Hereafter, let the skirt intensity be the value standardized by the maximum intensity of the pixel.

The CTF of the projection image will become high, so that the skirt intensity is small.

At the time, the projection images shown in FIG. 5A are CTF=40 and the half-widthe 50 (% notation omitted).

As shown in FIG. 5A, in spite of being the resolution of the character including square of the few number of the pixels of the 10 pixels and the 12 pixels, it turns out that it is the projection image which can decipher the "rose" character easily and provide high "resolution" and good "sharpness".

On the other hand, the continuity of the white background and the black line is uniform, and it turns out that it also provide the projection image with good "smoothness of the field and the edge."

Figure 5B:
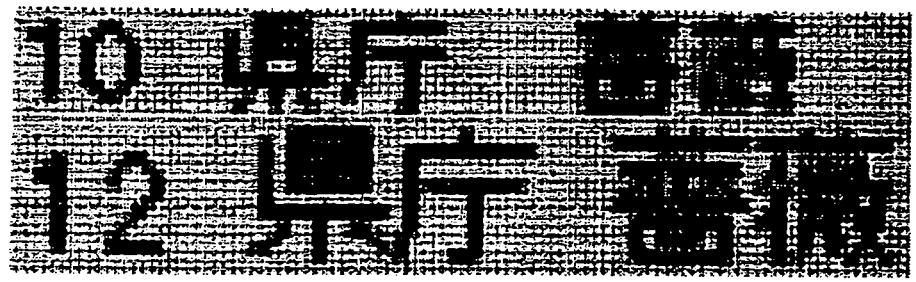
Figure 5C:

FIG. 5B and FIG. 5C show the comparative example 1, and the comparative example 2.

In the case of the CTF=40 and the half width=30 in the embodiment 1, FIG. 5B and FIG. 5C show the projection images which correspond in the case of the CTF=80 and the half width=50 respectively.

The embodiment 1 has "resolution" higher than the comparative examples 1 and 2, and good "sharpness" so that FIG. 5A which shows the result of the embodiment 1, and FIG. 5B which shows the comparative examples 1 and 2 and FIG. 5C may be compared and understood.

Simultaneously, it turns out that "the smoothness of the field and the edge" is the good projection image.

Figure 9A:
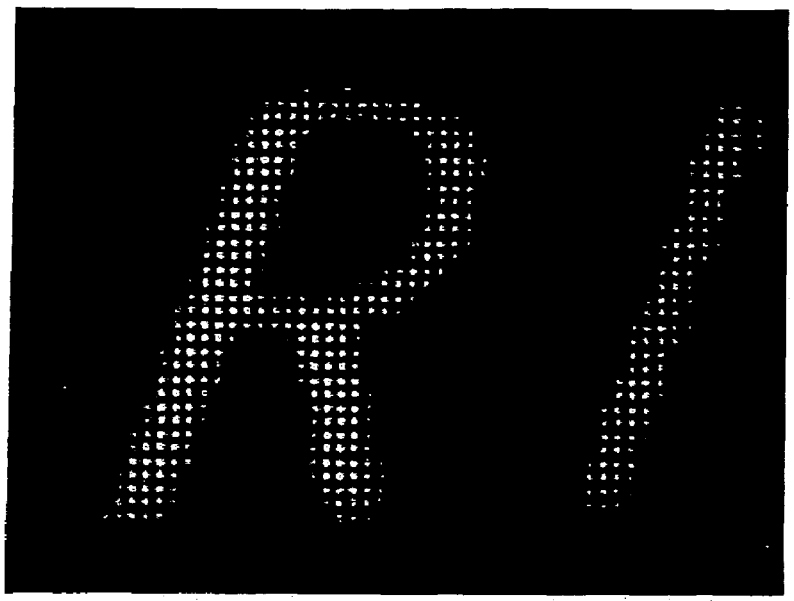
FIG. 9A and FIG. 9B are diagrams showing an example of the projection image for explaining the item of the subjectivity evaluation to the image quality of a projection image.

FIG. 9A is the example 1 for reference used as an example of the projection image for explaining the item of the subjectivity evaluation to the image quality of the projection image.

FIG. 9A is an example of the projection image measured by CCD arranged on the screen 9 when combining the pixel-profile deformation unit 7 and optical-axis shift unit which are projected by composition of the embodiment 1 shown in the FIG. 1.

FIG. 9A is the example on which the case where it displayed in the white character of the display in white is displayed, in order to make the beam configuration easy to see not for the black character which used the character of "R" (+"I") for the usual image evaluation but for explanation.

In this embodiment, the "R" is displayed as compared with the character including 16 pixels which do not use the optical-axis shift unit, by using 32 pixels which use the optical-axis shift unit, and the projection image according to this embodiment has high "resolution" and good "sharpness."

However, the full width at half maximum of the pixel is small, and it is the projection image which is inferior to some in the visibility in that "the smoothness of the field" lacks in the thick white line which constitutes "R."

Similarly, although "the smoothness of the edge" has improved by gradation control, it is the projection image inadequate for some.

However, such fault is changing CTF and can improve.

Figure 9B:
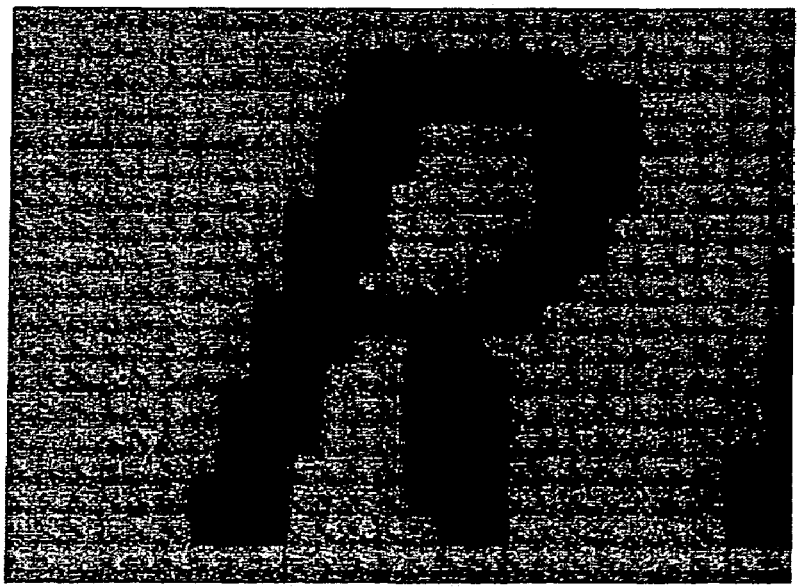

FIG. 9B shows other examples of the projection image for explaining the item of the subjectivity evaluation to the image quality of the projection image.

FIG. 9B is an example of the projection image measured by CCD arranged on the 9th page of the screen when omitting and projecting the pixel-profile deformation unit 7 and the optical-axis shift unit out of the composition of the embodiment 1 as shown in FIG. 1.

In FIG. 9B, since it is displayed in the character in which the character of "R" (+"I") consists of the number of the pixels with a square of with the 16 pixels, the "resolution" and the "sharpness" have deteriorated.

It is the image in which the "hardness" and the "jaggies" are conspicuous though it fully observes and evaluates from a distance, since the pixel of the rectangle configuration is projected.

However, about the white ground and black figures, it has "smoothness of the field" good enough.

The comprehensive result when forming the projection image for evaluation by calculation and the experiment, and carrying out subjectivity evaluation is shown in Table 1 like the FIG. 5 of the embodiment 3.

The projection image for evaluation is evaluated, after also changing the location and characteristics of the projection lens and optimizing, while changing the optical characteristics of the pixel-profile deformation unit.

TABLE 1

| CTF (%) | Skirt Intensity (%) | Half-Width (%) | | | | | |
|---|---|---|---|---|---|---|---|
| | | 30 | 40 | 50 | 60 | 70 | 80 |
| 30 | 54 | D | E | D | E | E | D |
| 40 | 43 | D | C | B | B | B | D |
| 50 | 33 | B | B | A | A | A | D |
| 80 | 11 | B | E | A | E | A | D |

Concerning the rating of image quality in Table 1, A indicates very good, B indicates good, C indicates acceptable, D indicates non-acceptable, and E indicates non-evaluation. Plural evaluations of the image (the embodiment 4) for the gradation, the sharpness and the noise have been given by ten observers based on the five phases of scaling which is the series criteria method. The result of 4.5 or more is Rating=A, the result of 4 or more points is Rating=B, the result of 3 or more points is Rating=C, the result of less than 3 points is Rating=D.

Subjectivity evaluation performed the projection image for evaluation to the ten observers based on the five phases of scaling which is the series criteria method.

The "sharpness" and the "jaggies" of the image which are mainly the index concerning the "smoothness of the field and the line" of the image using the evaluation based on the five phases of the scaling.

Although the above is the result of being related when increasing the number of the pixels the 4-fold (=2×2) imaging, when the number of the pixels is increased the 9-fold (=3×3) imaging, it will become large with the value.

It is because the lap arises between the pixels, the CTF deteriorates and the quality of image deteriorates, since it is the configuration where the profile lengthened the foot.

When the level which shifts the optical axis by the optical-axis shift unit is three or more pixels (except two), it is desirable that they are 0.7×2/3 times the rate of the pixel size reduction.

The image of the same convolution as the twice as many the optical-axis shift can be acquired by this, and degradation of the resolution by the cross talk between the adjoining pixels can be reduced also in the 3-fold or 4-fold one as many optical-axis shift as this.

As shown in Table 1, when the pixel profile is deformed into the pixel profile which is not the rectangle configuration, it turns out that the good projection image is acquired for the full width at half maximum also by the case of 70 at the maximum.

Moreover, even if CTF is 40% or more, it turns out that the good projection image is obtained. It is desirable that the CTF is less than 80% and more than 40%. It is more desirable that the CTF is less than 70% and more than 50%.

When the full width at half maximum is 70% or less and the CTF is more than 50% at the maximum, it turns out that a very good projection image is acquired.

Moreover, although not indicated in Table 1, most image quality can improve the optical use efficiency greatly by making the full width at half maximum larger than 50%, without making it deteriorate, it is more desirable, from the point of acquiring the bright image, that the full width at half maximum is larger than 50%.

In the case of the pixel-profile deformation unit 10 by the micro-lens array which is united with the LCOS of composition of having been shown in FIG. 4, the thickness of the transparent substrate 11 is set to t, the radius of curvature is set to r, and the thickness of the adhesives layer 14 is set to 4 micrometers, with the index of refraction 1.4.

The model A of Table 2 is the embodiment 5 more at the detail.

The CTF on the plane of projection when using the pixel reduction optical system and the full width at half maximum, and the optical use efficiency of the optical system are searched for in ray-tracing simulation.

The models B and C which are the following examples of comparison are also indicated to Table 2.

TABLE 2

| | n | t (μm) | r (μm) | CTF (%) | η (%) | α (%) |
|---|---|---|---|---|---|---|
| Model A | 1.84 | 10 | 21.2 | 81.5 | 59.4 | 71.0 |
| Model B | 1.75 | 22 | 10 | 70.0 | 57.6 | 50.3 |
| Model C | 1.75 | 13 | 13 | 64.6 | 56.7 | 51.7 |

The models B and C of the example of comparison are the same as that of the embodiment 5 except being the pixel-profile deformation unit from which the pixel in the plane of incidence serves as half, and the full width at half maximum serves as about 50%.

Compared with Models B and C, Model A is understood that CTF which optical use efficiency is not concerned about the same, but expresses definition ability is high.

Moreover, the burden to the pixel reduction optical-system design with the larger full width at half maximum than 50% can decrease, therefore it can raise both definition ability and optical use efficiency.

Let the micro lens (convex configuration 16), the index of refraction n of the transparent substrate 11 and thickness t of the transparent substrate 11, and the radius of curvature r of the micro lens (convex configuration 16) be the pixel reduction optical systems of the publication in the composition of the FIG. 4 at the model D of Table 3.

In the embodiment, there is about 83% of optical use efficiency of the pixel reduction optical system.

The data of Models B and C are also written together to Table 3 as an example of comparison.

Since the good projection image is acquired from Table 3 and Table 1 even if the definition ability (CTF) of the projection image is not necessarily high, and CTF and optical use efficiency have the relation of the trade-off from it, if it holds down to the engine performance lower if CTF is 40% or more, the projection image display apparatus with the optical high use efficiency of the optical system can be offered.

TABLE 3

|  | n | t (μm) | r (μm) | CTF (%) | η (%) | α (%) |
|---|---|---|---|---|---|---|
| Model D | 1.63 | 20 | 10 | 40.5 | 82.8 | 55.0 |
| Model B | 1.75 | 22 | 10 | 70.0 | 57.6 | 50.3 |
| Model C | 1.75 | 17 | 13 | 64.6 | 56.7 | 51.7 |

In this embodiment, it is assumed that the full width at half maximum is less than 70%, and the skirt intensity CTF is larger than 50%.

Let the micro lens (convex configuration 16), the index of refraction n of the transparent substrate 11 and thickness t of the transparent substrate 11, and the radius of curvature r of the micro lens (convex configuration 16) be the pixel reduction optical systems of the publication in the composition of the FIG. 4 at the model F of Table 4.

Model F is an example to which the full width at half maximum of the projection pixel profile fills CTF>=50% of the projection image with less than 70%.

As an example of comparison, Model G is written together to Table 4.

With Model G, in the example from which the full width at half maximum becomes 70% or more, it is high, but on the other hand the part with the small reduction effectiveness and the optical use efficiency become the definition ability CTF of the projection image very small.

50% shows that P0/P1=0.33, i.e., the relative intensity of the portion which crosses the contiguity pixel, are 33% from the formula 1 in CTF of the projection image.

Therefore, the projection image display apparatus with the full width at half maximum sufficient the balance with the optical system by which the profile from which less than 70% and the skirt intensity become less than 33% is obtained and the optical use efficiency on the plane of incidence is obtained like this embodiment.

More preferably, the full width at half maximum is larger than 30% and less than 70%, and the skirt intensity is less than 33%.

On the above condition, the jaggies of the image that are easily conspicuous can be reduced.

TABLE 4

|  | n | t (μm) | r (μm) | CTF (%) | η (%) | α (%) |
|---|---|---|---|---|---|---|
| Model F | 1.63 | 35 | 10 | 57.0 | 61.2 | 60.1 |
| Model G | 1.52 | 30 | 10 | 27.5 | 90.0 | 98.4 |

Figure 10:
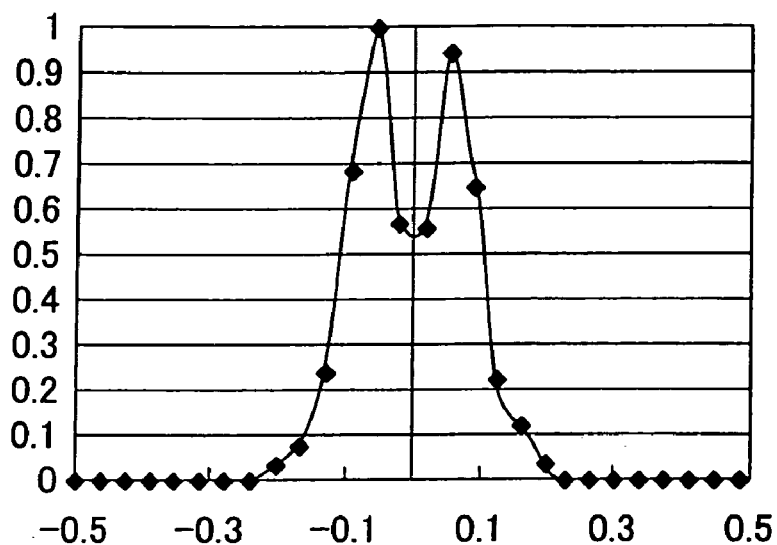
FIG. 10 is a diagram for explaining the characteristics of an example of the pixel profile according to one embodiment of the present invention.

FIG. 10 shows the characteristics of an example of the pixel profile according to the embodiment 8 of the invention which is deformed into a pixel profile having the pixel of the rectangle-like pixel profile and the shape of a concave near the center of the pixel.

As the profile of each pixel on which it is projected by the screen in the embodiment is shown in FIG. 10, it becomes the circumference of the pixel. At the relative positions (−0.1 to +0.1) of the horizontal axis of FIG. 10, the optical intensity drops.

Figure 11:
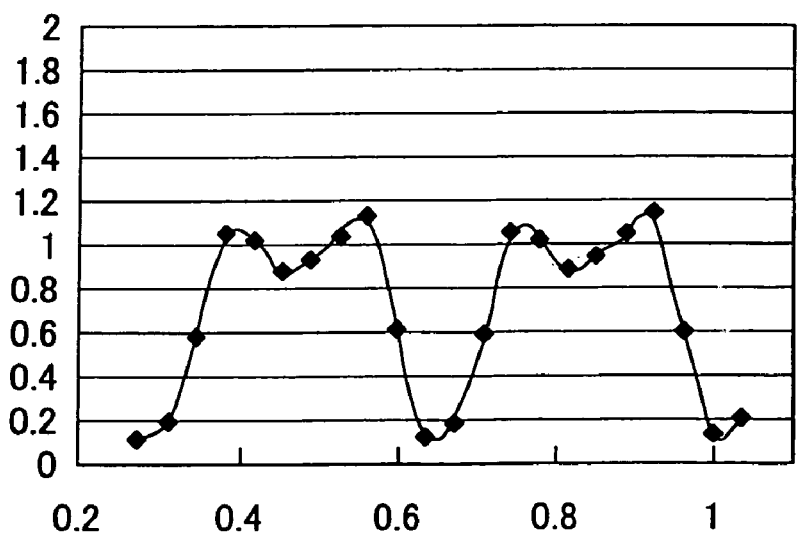
FIG. 11 is a diagram showing the results of calculation of the profile on the screen.

The pixel is shifted by the optical-axis shift unit, and the case of the image used as the maximum spatial frequency, i.e., the display image to which the contiguity pixel repeats ON and OFF, it becomes as it is shown in FIG. 11, when the profile in the screen is calculated.

When the circumference intensity of one pixel profile on which it is projected falls, the good image is acquired even if it displays the image used as the maximum spatial frequency.

The good visibility by higher resolution and the smooth image and optical, still higher use efficiency are realizable by not being the rectangle-like, and realizing the pixel profile of the special configuration which has the % oŠ in the center section upwards by the original pixel or the pixel on the screen, and controlling the configuration appropriately.

Although the is the same as the configuration of the two crests, the power intensity against the ends is distributed, the optical intensity which is the original pixel is the ends side of the edge and the center of the pixel, and it will be concentrated inside the edge.

Furthermore, although the spatial frequency which the female of the center section of the one pixel gives is high, and MTF of the projection lens and the observer's MTF serve as the small spatial frequency and can measure in CCD, in actual subjectivity evaluation, the visibility is low and the point does not pose the problem.

For the reason, from the shape of a conventional rectangle, since the portion of the shoulder of the edge has curvature, though between the pixels which adjoined laps, the edge rises, and it is bad invisible.

On the other hand, the visibility with the flat luminance whose peak of the two crests is the pixel is given, in the case of the conventional rectangle profile, and the pixel portion where the recess is small, which does not lap since it cannot elapse and judge is checked by looking with the pixel with flat good luminance.

The optical energy of the female of the center section becomes two crest portions, from considering as near the edge of the adjacent part between the pixels with which it does not lap when carrying out the optical-axis shift, the smoothness, simultaneously sharpness are also realized and high resolution can be realized If it becomes blunt with the rectangle drawing projection lens, to the inclination which the edge of both shoulders falls by making the center section into the convex, and becomes in sine, the pixel profile with the female of 2 crests will have the small ratio from which the center section becomes the convex to the ratio from which the edge of both shoulders falls, and it will be hard to be influenced of MTF degradation.

Figure 12A:
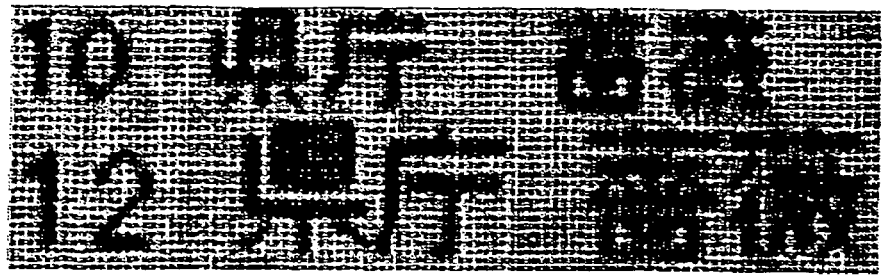
FIG. 12A, FIG. 12B, and FIG. 12C are diagrams showing examples of the projection image for explaining the item of the subjectivity evaluation to the image quality of the projection image.
Figure 12B:
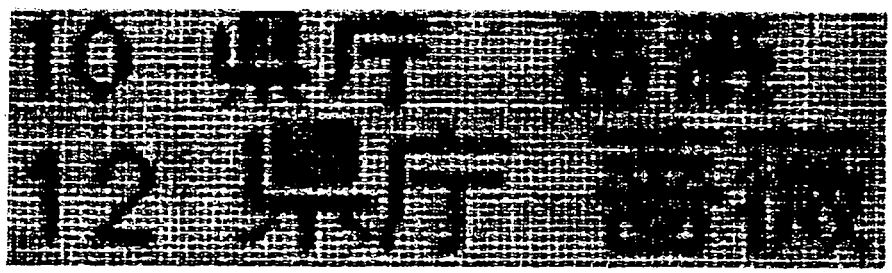
Figure 12C:
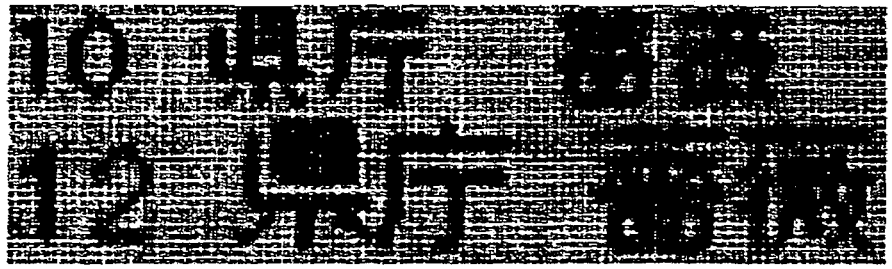

FIG. 12A (Rating B), FIG. 12B (Rating B), and FIG. 12C (Rating C) are the examples of the results of calculation concerning the projection image including the projection pixel on the screen 9 when using the pixel-profile deformation unit 7 in the composition of the embodiment 1 which showed the pixel-profile deformation unit to FIG. 1 united with the LCOS similar to the case of the embodiment 3 of the present invention using the optical-design evaluation tool.

Table 5 shows the comprehensive result when forming the projection image for evaluation by calculation and the experiment, and carrying out subjectivity evaluation as well as the case of Table 1 of the embodiment 4 (minimum value of the recess intensity estimated as the best and good image [%]).

In Table 5, the projection image for evaluation is evaluated, after also changing the location and characteristics of the projection lens and optimizing, while changing the optical characteristics of the pixel-profile deformation unit.

TABLE 5

|  |  | α (%) | | |
|---|---|---|---|---|
|  |  | 50 | 60 | 70 |
| CTF (%) | 40 | 0 | 40 | 80 |
|  | 50 | 0 | 40 | 80 |
|  | 60 | 0 | 0 | 80 |

In this embodiment, as shown in Table 5, if the recess intensity is 40% or more of peak intensity preferably, the good image will be acquired.

Furthermore, if it is the projection pixel profile more preferably so that it may become 80% of peak intensity, it will provide the projection image display apparatus having high optical use efficiency. However, the "smoothness of the image" deteriorates conversely when the peak intensity is 100%. For the reason, it is desirable that the peak intensity is 95% or less. It is more desirable that the peak intensity is larger than 80% and less than 90%.

If the full width at half maximum is less than 60% in general, even if the pixel profile has the depression of the center of the pixel, the good projection image is acquired from the simulation result (Table 5) of the above-mentioned pixel profile.

Furthermore, when the central depression portion is the pixel profile which is about 80% of the maximum intensity, the projection image with the full width at half maximum good (it is at least less than 70%) is acquired.

In this embodiment, the ray-tracing calculation investigated the profile on the plane of incidence when displaying one pixel or one line, is used with the index of refraction of the micro lens (convex configuration 16) in the composition of FIG. 4 and the index of refraction of the transparent substrate 11 being set to 1.75, the thickness of the transparent substrate 11 being set to 15 micrometers, and the radius of curvature of the micro lens (convex configuration 16) being set to 10 micrometers.

FIG. 10 shows the result of the above calculations.

In FIG. 10, the horizontal axis expresses the location on the plane of incidence, and the axis of ordinate expresses the intensity of the projection image.

Table 6 shows the characteristics of the image on the plane of incidence acquired in this embodiment. The intensity of the center of the pixel is about 56% of the peak. Preferably, if the intensity of the center of the pixel is the profile of the shape of a concave which becomes 40% or more of the peak, it will be the image used as the maximum spatial frequency when carrying out the wobbling, and the better image will be acquired.

TABLE 6

|  | n | t (μm) | r (μm) | CTF (%) | η (%) | α (%) |
|---|---|---|---|---|---|---|
| Model H | 1.75 | 15 | 10 | 79.4 | 53.1 | 57.5 |

As shown in Table 6, the characteristics which are not inferiority compared with the above comparative examples are acquired.

Moreover, from the result of Table 5, if the full width at half maximum of the projection image is about 50%, it would not be influenced by the intensity of the portion which crosses the contiguity pixel, but the intensity near the pixel center may fall to 0.

The good projection image is acquired by this embodiment, using the micro-lens array shown in the model A in Table 2, the model D in Table 3, the model F of Table 4, and the model H in Table 6 as the pixel reduction optical unit.

Although the pixel reduction optical system is installed in near and the space modulator itself of the spatial optical modulator in each embodiment, the need of adhering to especially these composition may be composition which there is not and has arranged the micro lens between the micro-lens array and the spatial optical modulator.

Figure 13:
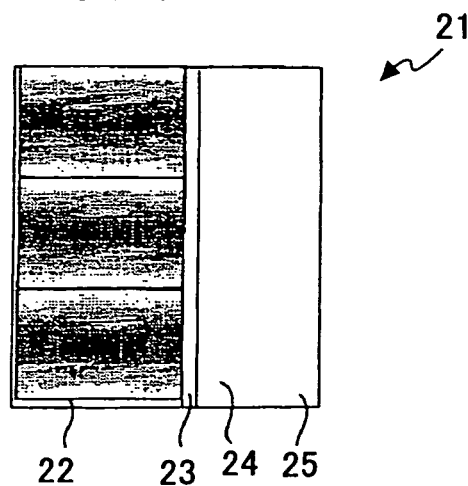
FIG. 13 is a diagram showing an example of the pixel-profile deformation unit of the embodiment 11 of the present invention.

FIG. 13 shows an example of the pixel-profile deformation unit for use in the image display apparatus of the embodiment 11 of the present invention.

As shown in FIG. 13, the pixel-profile deformation unit 21 of this embodiment includes a gradient-index lens array 22 corresponding to the pixel pitch of the spatial optical modulator in the pixel reduction optical system, as shown in FIG. 13. In the lens array 22, the refractive index is distributed therein.

In FIG. 13, reference numeral 23 is the liquid crystal layer, 24 is the flattened layer, and 25 is the back plain.

The good image is acquired by providing the gradient-index-lens array 22 of this embodiment so that it may become the same range as the case of the previous embodiment having the profile of the projection pixel mentioned above.

The case of the form of the operation may also be the composition which has arranged the micro lens between the spatial optical modulator and the gradient-index-lens array 22.

Figure 14:
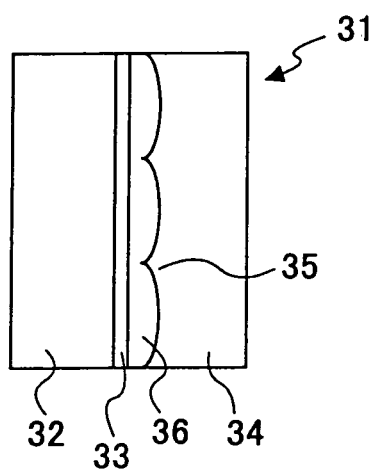
FIG. 14 is a diagram showing an example of the pixel-profile deformation unit according to one embodiment of the present invention.

FIG. 14 shows an example of the image display apparatus according to the embodiment 12 of the present invention.

As shown in FIG. 14, the reflection-type liquid crystal unit is used for the pixel-profile deformation unit 31 of the embodiment as a spatial optical modulator, including the transparent substrate 32, the liquid crystal layer 33, and the back plain 34, and the TFT for the back plain 34 driving the liquid crystal etc. is accumulated.

With the conventional reflection-type liquid crystal unit (the liquid crystal unit called especially the LCOS), the maximum surface of the back plain is the reflector plate.

The reflector plate of the pixel-profile deformation unit includes a concave surface mirror array 35, and the concave surface mirror array 35 and the liquid crystal layer 33 of the embodiment 12 includes the flattened layer 36. The concave surface mirror array 35 includes the concave surface mirror.

As a liquid crystal unit, although the transference electrode, the orientation film, etc. are required suitably, since these detailed explanation is unnecessary, for explanation of the pixel reduction optical system, it is omitted by view 14.

In FIG. 14, the index of refraction of the flattened layer 36 is set to 1.52, and the radius of curvature of the concave surface mirror array 35 is set to 150 micrometers. A description of the thickness of the liquid crystal layer 33 and the thickness of the transparent substrate 32 will be omitted as they are negligible with respect to the effectiveness of the embodiment.

When the ray-tracing calculation is carried out with the composition of the embodiment 12 of the invention, the characteristics shown in Table 7 are acquired.

As is apparent from the results of Table 1 and Table 7, the embodiment 12 makes it possible to prove good efficiency and high resolution projection image.

TABLE 7

| CTF (%) | η (%) | α (%) |
|---|---|---|
| 81.9 | 80.1 | 70.1 |

Figure 15:
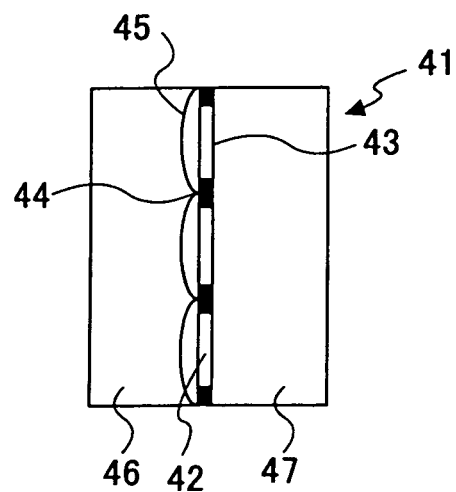
FIG. 15 is a diagram showing an example of a spatial optical modulator according to one embodiment of the present invention.
Figure 16:
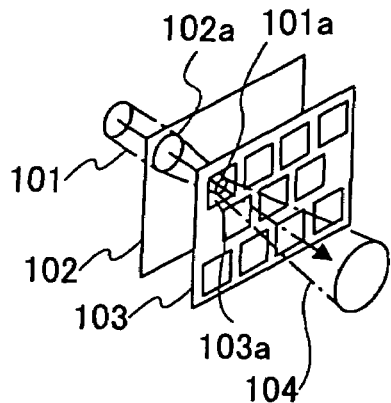
FIG. 16 is a perspective view of an example of a conventional projection image display apparatus.
Figure 17A:
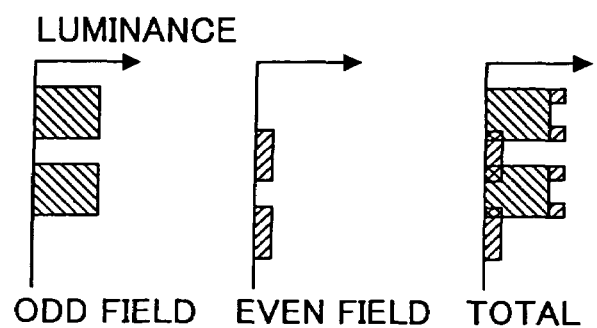
FIG. 17A and FIG. 17B are diagrams for explaining the operation of the projection image display apparatus of FIG. 16.
Figure 17B:
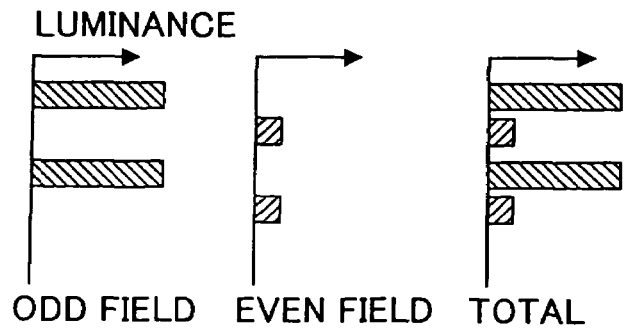

FIG. 15 shows an example of composition of the embodiment 13 of the present invention. In this embodiment, the pixel reduction optical system is configured by using the aperture array.

The reflection-type liquid crystal unit 41 of the embodiment 13 is provided as a spatial optical modulator, and it includes the liquid crystal layer 42, the covered parts 44 and the micro lens 45 to which the pixel reduction optical system limits the aperture 43 to the liquid crystal layer 42 or in the vicinity of the liquid crystal layer 42.

In FIG. 15, reference numeral 46 is the transparent substrate, and reference numeral 47 is the back plain.

Usually, the liquid crystal unit makes small magnitude of the pixel of spatial optical-modulator 41 the very thing by lowering the rate of the aperture positively conversely in the embodiment, although the device which makes the rate of the aperture high is made.

Table 8 is the result of calculations by changing the area of the covered part 44 to three different values.

If the rate of the aperture is made 60%, the CTF which shows the definition ability of the projection image will be 100%.

That is, the contiguity pixel by which the wobbling is carried out is not crossed.

TABLE 8

| Aperture Ratio (%) | CTF (%) | η (%) | α (%) |
|---|---|---|---|
| 80 | 47.5 | 79.2 | 85.2 |
| 70 | 83.3 | 69.3 | 79.9 |
| 60 | 100.0 | 59.4 | 77.5 |

The full width at half maximum of the projection pixel profile of the embodiment 13 is about 78%, and according to Table 1, it is close to the image (the full width at half maximum is 80% or more) which is not good.

However, since CTF is high, the high resolution image is acquired in Table 8.

Figure 18:
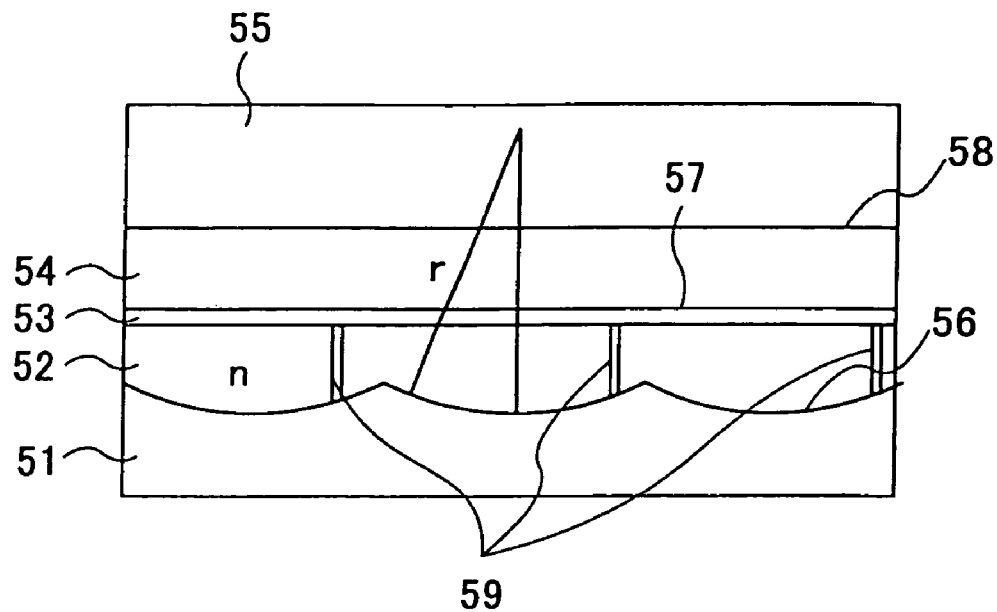
FIG. 18 is a cross-sectional view of a reflection-type light valve according to one embodiment of the image display apparatus of the present invention.

FIG. 18 shows an example of composition of the embodiment 14 of the image display apparatus of the present invention.

Specifically, FIG. 18 shows the cross section of the reflection-type light valve which has the concave mirror used as the pixel-profile deformation unit for every pixel in the reflection-type image display apparatus which increases the resolution of the original reflection-type light valve using the optical-axis shift unit.

Only the basic composition of the reflection-type light valve is shown in FIG. 18.

As shown in FIG. 18, the picture element used as the space optical modulator includes the reflective concave surface configuration 51, the embedding layer 52 which is the layer of a transparent material, and the liquid crystal layer 54.

The reflection electrode 56 is provided between the reflective concave surface configuration 51 and the embedding layer 52.

On the embedding layer 52, the flattened layer 53 is provided. The transparent electrode 57 is provided above the upper surface of the flattened layer 53 and under the liquid crystal layer 54. The opposite substrate 55 is formed on the liquid crystal layer 54, and the transparent electrode 58 is separately formed in the liquid crystal side of the opposite substrate 55.

Although illustration is not carried out for the transference electrode 57 and the reflector 56, they are separately provided for every pixel, and they are electrically connected together by the through-hole filling material 59.

The index of refraction of the embedding layer 52 is set to n, and the radius of curvature of the concave surface reflector plate 51 is set to r.

The $SiO_2$ substrate with the elevated-temperature pSi, or the silicon substrate is used for the substrate of the reflective concave mirror 1.

The thin films, such as ITO, are used for the electrode 57 with the thin film of the metals, such as aluminum, transparent again by the reflector 56.

Figure 19:
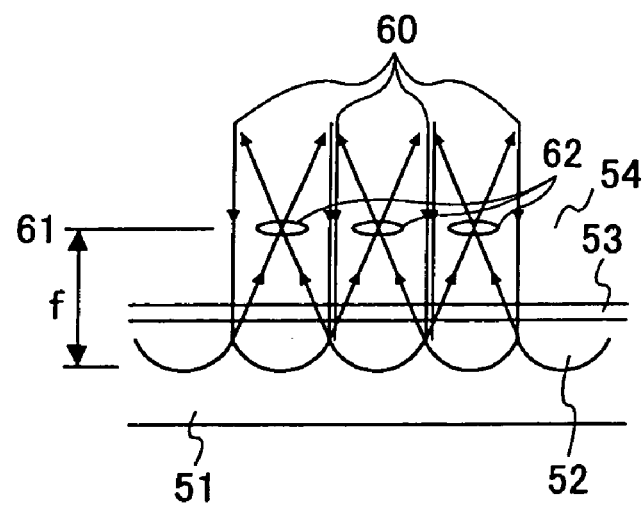
FIG. 19 is a diagram for explaining operation of the reflection-type light valve of FIG. 18.

FIG. 19 shows the outline of the operation of the embodiment 14 of FIG. 18.

FIG. 19 shows the condition that the image of the pixel is formed by operation and the reflective concave mirror of irradiation beam in the embodiment 14 of FIG. 18.

As for the incoming light 60, only the parallel light is shown in FIG. 19. The incoming light 60 passes through the liquid crystal layer 4 and the translucent flattened layer 53, and is incident to the reflective concave mirror 51. It is reflected and focused by the reflective concave mirror 51, and the new reduced pixel 62 is in the focusing state of the pixel near portion 61, and the focal point f to which the pixel size is reduced is formed.

Figure 20:
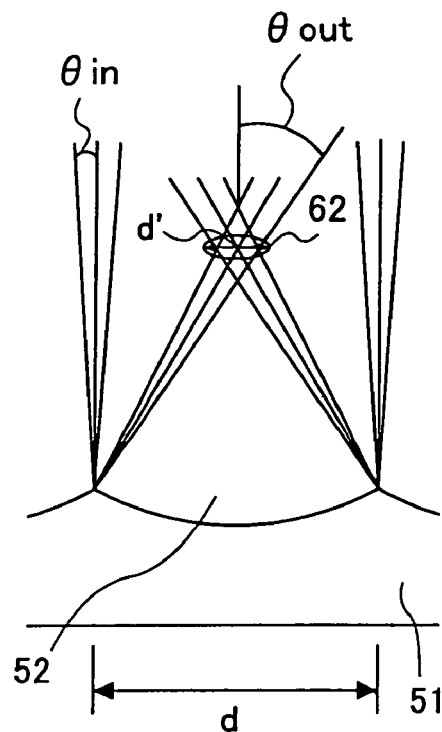
FIG. 20 is a diagram for explaining a relation between the maximum angle at the time of incidence to the pixel and the maximum angle at the time of reflection.

In FIG. 19, the reduced pixel 62 has spread because the light ray of the light source spreads, and there is the lighting angle (angle of divergence) (see FIG. 20).

When it sees geometrically, the magnitude of the reduced pixel has the magnitude according to the lighting angle and the focal distance. According to the yield, the reduced pixel becomes still larger.

In projecting the pixel profile of the reduced pixel that deformed on the screen using the projection lens, corresponding to the transfer function of the projection lens, it receives the deformation of the further pixel profile.

However, the reflection light from the pixel can form the focusing state by which pixel reduction is carried out at the near portion 61 the focal location of the reflective concave mirror 1 by optimizing these.

FIG. 20 shows the relation between maximum angle θ in at the time of incidence to the pixel, and maximum angle θ out at the time of reflection or outgoing.

The θ in is determined by the irradiation optical system, and about the incident light to irradiate, although it is the fixed value, the θ out changes with n and r.

In FIG. 20, although the θ out is considering as the angle of about half of the spreading of the light ray, when the pixel size is reduced to about ½, it serves as the twice as many the angle (+/−θ out) as this.

Since the pixel profile in the focusing state where pixel size is reduced is near the focus of the optical element as shown in FIG. 20, the include-angle distribution of the irradiation beam to the pixel also influences greatly.

It is desirable for the rates of reduction of the pixel to differ greatly, and to optimize these by characteristics, the location relation, etc. of the contour configuration of the pixel itself, the curvature profile of the concave mirror, and the projection lens.

When carrying out pixel reduction of the reflection light with the concave mirror, it is not only necessary to set the pixel size to one half.

The pixel profile which deformed when performing high-resolution imaging using the optical-axis shift unit is not only the rate of reduction of the pixel, and the visibility, such as resolution of the image and the smoothness, is not necessarily determined.

Also in the same rate of pixel reduction, if the pixel profiles differ, it may become the greatly different visibility.

Even if pixel size is not ½, the big difference may not be accepted in the visibility.

Figure 21:
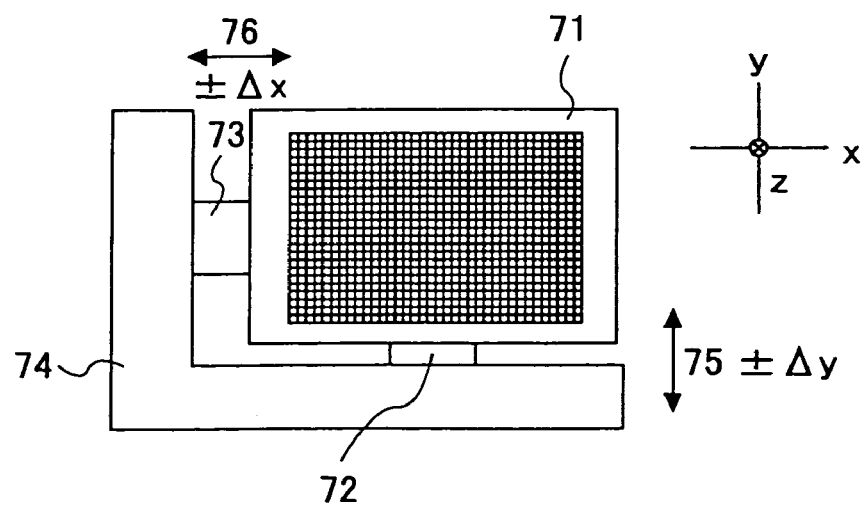
FIG. 21 is a diagram for explaining the operation which changes the pixel profile output by the reflection-type light valve, and increases the number of the pixels.

FIG. 21 shows the embodiment 15 of the image display apparatus of the present invention.

The pixel profile which acts as reflection from the reflective concave mirror by the reflection-type light valve which can set the embodiment 14 (it acts as reflection from the pixel) is deformed, and the unit for which the pixel to which pixel size is reduced modulates the light path (it shifts spatially) shows operation which increases the number of the pixels (image of the pixel).

In the embodiment, the piezoelectric elements 72 and 73 are used as means to modulate the light path of the light which acted as reflection from the pixel of the spatial optical modulator 71 (it sees at right angles to the optical axis).

This moves mechanically special modulation unit 71 by using the piezoelectric elements 72 and 73.

In order for the unit itself to move, the pixel will also move.

If the piezoelectric element is used, even if pixel size will be about ten micrometers or less, the light path not more than it can be shifted.

The piezoelectric elements 72 and 73 are installed in the y-axis orientation 75 and the x-axis orientation 76 on the spatial optical modulator 71 and the jig 74, and they are moved periodically.

In addition, the z-axis is the direction perpendicular to the surface of the drawing, and is in agreement with the optical axis.

The pixel profile which acts as reflection from the reflective concave mirror by the reflection-type light valve in the embodiment 14 of FIG. 18 is deformed as in FIG. 22A to FIG. 22G, it is projected on the pixel to which the pixel size is reduced by the screen by the optical-axis shift unit in the embodiment 15 of FIG. 21, and operation from which it becomes the image of the high resolution is shown.

Here, the rate of reduction ($\alpha$) of the pixel size by the micro-lens array is set to one half.

The pixel of the spatial optical modulator is the square, and it is the square reduction image noting that it is reduced ideally.

The initial state which is not moving probably is set to the state of FIG. 22A.

The state where the pixel size of the spatial optical modulator made it shift ½ in the direction of y is set to the state of FIG. 22B.

When the pixel size is set to 14 micrometers, delta x and delta y are set to 7 micrometers.

The state where the pixel size is made to shift by ½ from the state of FIG. 22B in the x directions is the state of FIG. 22C.

The state where pixel size made it shift by ½ in the direction (the minus direction) opposite to FIG. 22B is the state of FIG. 22D.

The state where it is made to shift in the direction opposite to FIG. 22C is the sate of FIG. 22E.

The state where pixel size made it shift ½ in the direction of y is the state of FIG. 22F.

Subsequently, it returns to the state of FIG. 22A.

Consequently, the high precision imaging (FIG. 22 G) is performed so that the size of the one side of the pixel is ½, and it is the 4-fold high resolution imaging that can be realized without sensing the flicker of the image, if the periodicity of these shifts is small.

Moreover, in the example, since the optical system is extended since the spatial optical modulator and light-path modulation means become the one device, and it becomes unnecessary to intercalate light-path modulation equipment, it leads to the miniaturization of equipment.

Although the above-mentioned example is moved in the two directions of x and y, it is possible to be the shift of the direction of either x or y. In this case, the pixel size is doubled.

Moreover, the 9-fold high resolution imaging as many increase in the number of the pixels as the can expect the amount of shifts by ⅓, then 3×3, using alpha as one third.

What is necessary is just the light-path shifting unit which shifts the light path in space coordinates, also besides moving the reflection-type light valve mechanically directly, using the optical element using the liquid crystal which is the double-refraction material, the parallel shift of the optical axis may be carried out, the optical axis may be deflected, or the optical-axis shift unit of FIG. 21 may perform simultaneously the parallel shift of the optical axis, and the deviation of the optical axis.

It is possible to carry out the displacement of the transparent member from which the wedge configuration and the optical path arranged aslant differ mechanically.

Figure 23:
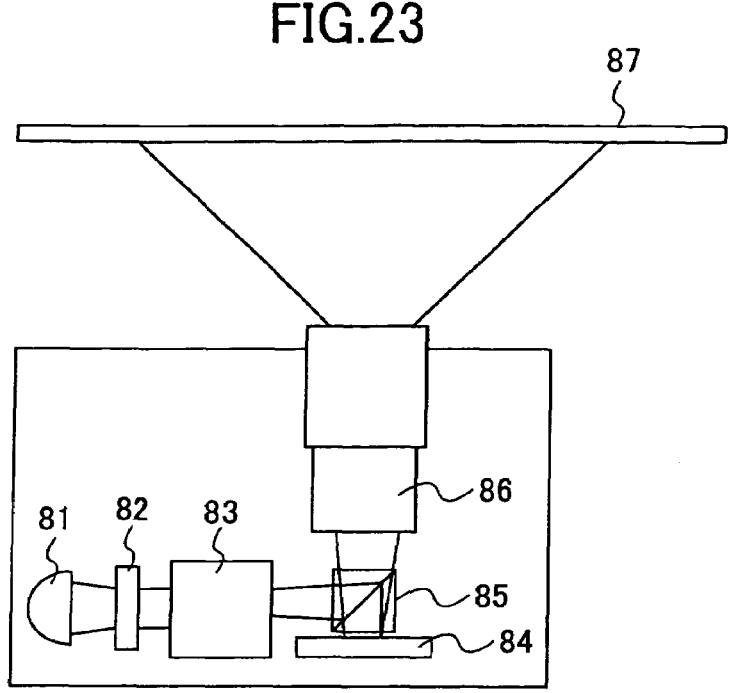
FIG. 23 is a diagram for explaining an example of a high precision projector according to one embodiment of the present invention.

FIG. 23 shows the embodiment 16 from which the pixel to which the pixel profile which acts as reflection from the reflective concave mirror by the reflection-type light valve which can set the embodiment 14 of FIG. 18 is deformed into based on operation shown by FIG. 22A or FIG. 22G, and pixel size is reduced serves as composition of the image display apparatus which is projected by the time sharing by the screen by the optical-axis shift unit in the embodiment 15 of FIG. 21, and realizes the image display of the high resolution.

Specifically, it is related with the high precision image projection equipment (projector) which uses the above-mentioned image display apparatus of high precision imaging.

As an example, the example of the veneer formula projector which uses one reflection-type spatial optical modulator is shown.

In FIG. 23, as for the light which came out of the white light source 81, the illuminance is first equalized by the equalization optical elements (optical integrator) 82, such as the fly eye lens.

Next, the color separation units 83, such as the color wheel, separate into the three colors of red, green, and blue.

When the color wheel is used, simultaneously, it does not separate into red, green, and blue, but red, green, and blue separate into the time series.

Next, it goes into the polarization beam splitter 85 for every color, is reflected by the pixel of the spatial optical modulator (reflection-type liquid crystal light valve) 84, and escapes from the polarization beam splitter 85, and finally, it is projected with the projection lens 86 and the high precision image is formed in the screen 87.

Besides LCOS which is the reflection-type light valve given in the embodiment 14 of FIG. 18 as a spatial optical modulator, the MEMS technique may be used like DMD and the reflection-type deviation unit may be used.

Moreover, the method using the spatial optical modulator is not restricted to the veneer formula of FIG. 23, and its reliance is also good at 3 plate type and 2 plate type.

Since the spatial optical modulator combines with the optical-axis shift unit, it is desirable that it is the thing of the high-speed response.

The image display apparatus which is made to expand the image and is displayed is sufficient by using the magnifying lens for virtual-image formation in which the virtual-image display like the magnifier is possible, and expanding as a virtual image besides the equipment which displays the image of the high resolution which expanded the reduced pixel by which the pixel profile is deformed like the projector shown in FIG. 23 by the imaging with which the relation of the conjugate is filled using the projection lens.

Thereby, it is possible for the image display apparatus of this embodiment to provide a small display for the finder of a video camera, a head mounted display, a cellular phone, etc.

When the reflection-type light valve is combined with the optical-axis shift unit in the present invention and the high resolution is displayed using the reflection-type pixel reduction unit, the difference in the action when comparing with the case where the pixel reduction by the micro lens on the conventional opposite substrate is used is explained below.

It sets to the reflection-type light valve with the composition shown in the FIG. 18 of the embodiment 14 and FIG. 21, and FIG. 23.

The time of making the opposite substrate, since the required optical element of alignment is not prepared in the silicon substrate which has the reflector, and the substrate which counters unlike the case where the conventional micro lens is prepared in the light source side when the pixel profile is deformed, it is necessary to use neither large sum superposition equipment nor the vibration-proofing facility at the time of attachment.

Moreover, when the yield of attachment also improves greatly, the imaging can be carried out easily at low cost.

Since the pixel profile does not change even if the horizontal location gap with the opposite substrate arises after attachment, it comes to excel in dependability.

By the glass substrate and silicon substrate which are usually used as an opposite substrate, since the difference is in the coefficient of expansion, the process temperature at the time of production and the use environment as a product had big restrictions.

In the silicon substrate of 1 inch of vertical angles, and the usual optical glass, even the temperature change of 10 degrees produces the dilation difference for several microns location gap at the ends.

In the temperature change of 100 degrees in the process of 120-150 degrees of adhesion hardening, there is the dilation difference 10 microns or more for the location gap.

These serve as location gap directly, or damage the liquid crystal spacer, or serve as camber and deteriorate the characteristics of the reflection-type light valve.

However, the influence of location gap is cancelable, and while it is more at low cost and can produce, the dependability under the severe environments, such as the cold district and in the car in summer, can be improved greatly.

Since the influence does not exist although the absolute location gap increases even if it uses the 2 inches large-sized reflection-type light valve, making the reflection-type light valve large-sized can also improve resolution more.

Since the unit which deforms the pixel profile into the silicon-substrate side is prepared unlike the case where the conventional micro lens is prepared in the light source side when the pixel profile is deformed in the reflection-type light valve with the composition shown in FIG. 18 of the embodiment 14 and FIG. 21, and FIG. 23

The liquid crystal layer is again penetrated after that in response to the action of the optical element which deforms the pixel profile after lighting light penetrates as it is first by using as the aperture the liquid crystal layer separately switched by polarization rotation combining the polarization separation unit.

For the reason, even if the micro lens by the side of the conventional light source gives the focusing function in order to reduce the first pixel profile, it may be expanded to the return and may be unable to contract.

Although the focal distance of the micro lens can be changed, the one lens can be made to be both able to act effectively in the outward trip and the return trip and pixel reduction can also be performed It is easy to receive limitation of the thickness of the lighting angle or the substrate, and the configuration of the micro lens etc., and since it is the one lens, and the power of the lens in the outward trip and the return trip is inevitably the same, the resolution and the optical capacity factor in the case of changing the pixel profile can also fully use neither the brighter lighting angle nor the darker projection lens.

On the other hand, the micro lens of the present invention can act by the light path after it, without the liquid crystal layer of the beginning of the outward trip acting. The resolution is better and it comes to design the deformation of the pixel profile so that optical efficiency may improve.

In the pixel-profile deformation by the micro lens prepared in the conventional opposite substrate, the image profile of the unrealizable configuration is realizable. High-resolution imaging is realizable.

It is the penetrated type micro lens and especially the F value can make the color yield with the very small big single lens there be nothing in the case of the mirror.

Also at the point, dispersion by the color of the pixel profile can be reduced greatly, and the high resolution can be conventionally realized now.

The present invention can improve resolution by decreasing the cross-talk of the contiguity pixels of the liquid crystal itself. The cross-talk of the image which adjoins by preparing the electrode pattern and the shading layer can be easily decreased now, and the image of the high resolution can be realized.

In FIG. 18, the concave mirror may not be limited to the spherical mirror and the aspherical mirror or the sculptured-surface mirror is sufficient as it. It is possible to use two or more sheets combining the plane mirror which does not have the curved surface.

By using for the mirror plane which countered the V character type aslant symmetrically by the two sheets, the level or perpendicular pixel profile of the either 1 direction can be deformed, and the pixel can be reduced.

When the three or more sheets are used, the pixel can be reduced more effectively and it is desirable.

By using the mirror plane of the four sheets which countered in the two directions aslant like the reverse pyramid configuration, the pixel is reducible in the two horizontal and vertical directions.

By increasing the number of sheets of the mirror plane, the pixel is effectively reducible.

Since these do not need to form the curved-surface configuration, when the number of sheets of the mirror plane is about several sheets, they can be manufactured comparatively easily using the MEMS technique, and are low costs more.

In FIG. 18, since it is not necessary to form the liquid crystal layer 54 in the concave surface configuration by having the embedding layer 52, it is not necessary to prepare the convex configuration in the opposite substrate. Location doubling etc. becomes unnecessary and it allows easy attachment.

Since the index of refraction becomes at least 1.3 or more by embedding the transparent derivative material, without considering as the air space and the focal distance f of the concave mirror (absolute value) is given by the formula: f=r/(nd) with the curvature r, and the diameter d and the index of refraction n, the focal distance of the concave mirror can be made small by 30 percent or more to the air space, even if it is the same curvature.

Many aberrations, such as the spherical yield on the shaft of the concave mirror, and the astigmatism besides the shaft, the coma, can be greatly decreased now, and it comes to be able to carry out the high resolution imaging more by reducing the rate of reduction of the pixel greatly.

In FIG. 18, the flattened layer 53 which becomes the upper part of the embedding layer 52 from another transparent material is formed, and flattening processing of the flattened layer 53 is carried out by the chemical polishing in the upper surface.

It is realizable to have formed the liquid crystal layer and to make thickness of the liquid crystal layer by the the less than 1 micron of plus or minus, after forming the transference electrode and the orientation film on the flattened layer 53.

The good contrast and homogeneity within the field can be realized, and the homogeneity within the panel improves.

The flattened layer 53 may unify and embed the embedding layer 52, and the layer itself may be used for it as a flattened layer.

In impressing the electric field to the liquid crystal, without forming the transparent electrode 57, the electric field can also be directly impressed by the reflector 56, and since the configuration is simple, it excels in dependability at low cost.

When the curvature of the concave mirror is small, or time pixel pitch is large (the concave surface configuration), the concave-convex difference of the member 51 becomes large, and the case where the electric field cannot be uniformly impressed to the liquid crystal layer 54 arises.

For the reason, as shown in FIG. 18, the uniform electric field can be impressed now to the liquid crystal layer within the pixel by forming the transparent electrode 57 separately on the flattened layer 53.

The contrast of the image can be improved now.

Besides contacting electrically using the through-hole filling member, the transparent electrode 57 and the transparent reflector 56 may make the embedding layer 52 thin, and may contact the transference electrode 57 electrically directly in the edge portion of the reflector 56.

In the composition of the embodiment 14 of FIG. 18, in order to evaluate the characteristics of the pixel profile quantitatively, the three kinds of evaluation parameter: (1) the CTF (Contrast Transfer Function) and (2) the rate of reduction α (alpha), and (3) the use efficiency η (eta) are used.

Figure 24A:
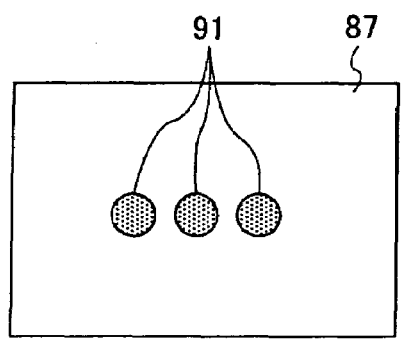
FIG. 24A and FIG. 24B are diagrams for explaining the definition of the CTF according to the present invention.
Figure 24B:
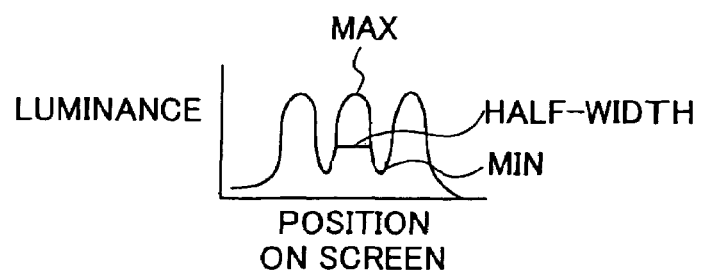

FIG. 24A and FIG. 24B are diagrams for explaining the definition of CTF.

The pixel profile is reduced by the pixel reduction unit from the original square, and FIG. 24A is the outline view of the outer diameter configuration at the time of deformation.

FIG. 24B is the optical intensity distribution map used as the pixel profile which is a cross-sectional view of the space horizontal direction of FIG. 24A.

As shown in FIG. 24A, while the three pixels 91 measured or checked by looking are not the pixel profile but the continuous pixel profiles of the perfect rectangle configuration as shown in FIG. 24B when it actually evaluates quantitatively, they have the minimum values MIN other than zero.

In the embodiment, as shown in the formula (11), CTF is defined by using the maximum value MAX of the pixel profile and the minimum value MIN of the pixel profile.

$$CTF=(MAX-MIN)/(MAX+MIN) \quad (11)$$

However, the first waveform is made into the pixel square wave of the reflection-type light valve to the usual MTF being the transfer function of the sine wave here.

For the reason, since it is CTF at the time of carrying out pixel reduction, the spatial frequency turns into the spatial frequency to which the inverse of the pitch of the original pixel corresponds as it is.

Since the CTF is the transfer function of the square wave, since CTF is determined by the MTF characteristics of the low frequency, they are not the number of the high frequency, and MTF of the specific spatial frequency and the thing which corresponds uniquely more except the corresponding spatial frequency.

It is the same as that of MTF from the viewpoint of the limit of resolution almost, and 50% or more of value of usual is however, more preferably good 30% or more preferably at least 20% or more.

If it is 65% or more, as the visibility, it will be recognized almost like the original square wave.

The measurement of CTF is performed by combining the microscope object lens and the CCD light-receiving unit through the prism type beam splitter.

Moreover, using the projection lens with which MTF characteristics differ instead of the microscope object lens, CCD has been directly arranged to the field which arranges the screen used as the conjugate, and is carried out to it.

The microscope object lens prepared the aperture as occasion demands, and incorporated the 20-fold high resolution as many SLWD of the long working distance of NIKON as the, and the 40-fold one, and NA is controlled and used for it.

Its own thing is used for the projection lens.

The amount of CCD of the dark noise is removed and calculated.

If the ideal optical system is used to the pixel profile of the rectangle configuration, the image on which it is projected on the screen is the rectangle, and can realize the clear image.

Although such an image obtains the good result by subjectivity evaluation, carrying out the deer when image information is the few data projector in the conventional display of low resolution The image quality which the feeling of the "jaggies" and the feeling of "discontinuity of gradation nature" arose by subjectivity evaluation, and is not necessarily excellent in the display of the conventional high resolution beyond twice in the image display apparatus which is going to realize the "smoothness" of the image, or the image display apparatus of the image information with the main image display of the video is not necessarily given.

These are combined also with the rate of reduction described to the corresponding following as the rate of the aperture, and influence image quality.

The rate of reduction is the same composition as the optical system by which CTF is evaluated, and is evaluated using the full width at half maximum.

The rate alpha of reduction is defined by the following formula (12).

Picture element size of the full width at half maximum/ spatial optical modulator of alpha=pixel profile (12)

However, when the expansion optical system is used, it normalized with the dilation ratio, and when the rate alpha of reduction is 1.0 or 100%, it could be twice, such as those without reduction.

This rate of reduction is important with CTF as a basis of high reduction of the image.

It turns out that it is in the state of fault reduction where the high precision image cannot become by the crevices other than the profile becoming remarkable shortly even if the value is too small conversely, although it is not reduced at all and cannot become the high precision imaging from the viewpoint of the high precision imaging by pixel reduction when alpha is 1.0.

Then, it is experimented in the relation of the rate of reduction and image quality at the time of shifting the image using the optical-axis shift unit by subjectivity evaluation.

The rate of reduction influences image quality greatly, when high resolving is formed using the optical-axis shift unit.

The result (embodiment 17) shown in Table 11 about the high reduction of the rate of reduction and the image is obtained from subjective evaluation of the image based on the profile as shown in FIG. 24A.

Concerning the increase in the number of the pixels described above, they could be the 4-fold high resolution imaging.

The image evaluated the image including the pixel which has the image profile from which alpha differs.

TABLE 11

(Embodiment 17)

| | α' | | | | | | | |
|---|---|---|---|---|---|---|---|---|
| | 0.25 | 0.35 | 0.4 | 0.5 | 0.6 | 0.7 | 0.8 | 1.0 |
| Image Quality | D | C | B | B | B | B | C | D |

Concerning the rating of image quality in Table 11, B indicates good, C indicates acceptable, and D indicates non-acceptable. Plural evaluations of the image (the embodiment 17) for the gradation, the sharpness and the noise have been given by ten observers based on the five phases of scaling which is the series criteria method. The result of 4 or more points is Rating=B, the result of 3 points is Rating=C, and the result of 2 or less points is Rating=D.

As shown in Table 11, when α'=1.0, the pixel image is not reduced at all and it is not a high precision image.

Although alpha' of effectiveness is not remarkable at 0.8, there is the difference as compared with the time of 1.0.

Therefore, the upper limit of alpha' is considered to be 0.9 order. It is preferable that it is less than 0.8 and larger than 0.35. It is more preferable that it is less than 0.7 and larger than 0.4.

Although alpha' should be suitably small just only in the high reduction of the image by pixel reduction, when making the number of the pixels increase, the rate of reduction must be the value according to the rate of increase.

Like the above-mentioned example, when the number of the pixels is increased the 4-fold (=2×2) one, 0.5 order is more suitable for alpha'.

However, when the number of the pixels is increased the 9-fold one (=3×3) in the value, it is large.

Since it is the configuration where the profile lengthened the foot, the lap arises between the pixels and CTF is because degradation and the quality of image deteriorate.

When the level which shifts the optical axis by the optical-axis shift unit is the three pieces [n or more] except two, it is desirable that they are 0.8*2/3 times the rate of pixel size reduction of the.

Thereby, the image of the same convolution as the twice as many optical-axis shift as the can be acquired.

Also in the 3-fold or 4-fold one as many optical-axis shift as the, degradation of the resolution by the cross talk between the adjoining pixels can be reduced.

More specifically, it is desirable that in the case of the 3-fold one, it is less than 0.53 and larger than 0.23. It is more desirable that it is less than 0.46 and larger than 0.23.

As for alpha', about 0.33 is the optimum value.

If the image is dark even if the image is high precision, it does not become good image quality, but use efficiency is also important.

As a scale which measures the, the use efficiency η about one pixel is defined in the following.

The use efficiency η is the ratio of the energy arrived at the range equivalent to one pixel on the screen to the energy reflected by one pixel on the light valve.

The definition of the use efficiency η at the time of projecting on the screen is shown in the following formula (13).

$$\eta = (\text{energy } (W) \text{ arrived at the range equivalent to one pixel on the screen})/(\text{energy reflected by one pixel on the light valve}) \quad (13)$$

In the case of the ½ pixel reduction (alpha=0.5) where the pixel size is simply reduced using the aperture of the shading layer only, the optical use efficiency η is 25%. It is desirable that the range of η is more than the level at least.

It is required to improve the above-mentioned value of CTF, alpha, and η appropriately about the high-resolution imaging using the optical-axis shift unit.

The production of the reflection-type light valve of the embodiment 14 of the invention will be described in the following.

The transparent derivative layer is formed by the thickness of about 2 microns on the aluminium metallic-reflection electrode, using the silicon-substrate back plain for the usual LCOS as it is.

The film formation method produces the $SiO_2$ layer, the SiON layer, the SiN layer, etc. by the PCVD, and the $Al_2O_3$ layer, the $TiO_2$ layer, the ZnO layer, etc. by the EB evaporation coating and the spattering.

Then, after forming the through hole for contact in the edge portion of the pixel, it is crowded in the aluminium metal into the portion with electrocasting.

Moreover, after forming the concave surface configuration resist layer for transfer with the gradation nature mask, the concave surface configuration of about 0.5-2.0 microns is formed by dry etching.

Then, after forming the aluminium electrode on the whole surface, in order to prevent contact between the pixels, etching removes the circumference portion.

Then, the transparent derivative layer is again formed by the thickness of the about 2 microns on the aluminium metallic-reflection electrode.

The film formation method produces the $SiO_2$ layer, the SiON layer, the SiN layer, etc. by the PCVD, and the $Al_2O_3$ layer, the $TiO_2$ layer, the ZnO layer, etc. by the EB evaporation coating and the spattering.

Then, after forming the 2nd through hole for contact in the edge portion of the pixel, it is crowded in the aluminium metal into the portion with electrocasting.

Then, after carrying out the chemical polishing and forming the ITO electrode on the whole surface, in order to prevent contact between the pixels, dry etching removes the circumference portion.

Furthermore, the orientation film of the polyimide is applied on the ITO film.

After this, similar to the usual LCOS, the attaching of the substrate to the opposing substrate, the assembly, the liquid pouring and the sealing are performed.

The reflection-type light valve of the embodiment 14 of the present invention used for and estimated the optical-design evaluation tool by composition as shown in FIG. 23 as the CCD camera which has arranged the projection image to the field expanded under the microscope as substitution of the screen side to the evaluation of the condition on the screen.

As an optical-design evaluation tool, the number of the rays of light is made into about 200,000 using the light-tools (the 3rd edition) of the U.S. optical research association company in which the non-sequential ray-tracing analysis is possible (when a 1-GHz CPU is used and it is the computational complexity for about 50 minutes).

In order to reduce the burden of calculation, the ray tracing is performed only about two or more pixels of the specific range, and calculated and evaluated the optical intensity distribution in the large range in the screen side by carrying out the convolution with the special calculation tool.

The value of 150 W class DC discharge lamp of Ushio Co. is used for the high-pressure mercury lamp.

By the fly eye lens of 5×8, the lighting angle carried out design production so that the perpendicular lighting angle might become the 7-fold one.

The projection lens installed the aperture equivalent to the thing of high resolving of F2.4.

Table 12 shows the embodiment 18 and the embodiment 19 of the invention with which the evaluation value of the pixel reduction in the composition of FIG. 18 has been obtained.

The embodiment 18 uses the index of refraction n=1.83 of the embedding layer 2 and the radius of curvature: r=150 microns, while the embodiment 19 uses the index of refraction n=1.83 of the embedding layer 2 and the radius of curvature: r=190 microns. The pixel pitch is 14 microns.

TABLE 12

|  | CTF (%) | η (%) | α (%) |
|---|---|---|---|
| Embodiment 18 | 80.9 | 74.7 | 52.8 |
| Embodiment 19 | 80.1 | 82.8 | 50.4 |

Moreover, the example 11 of comparison at the time of using the micro lens is shown in Table 13, and the example 12 of comparison is shown in Table 14.

The index of refraction is the index of refraction of the member which has the convex configuration.

The members which have the shape of a concave are the photoresist adhesives of the fluorine system.

The index of refraction is n=1.4.

Thickness t is the distance of the heights of the member which have the convex configuration, and the liquid crystal layer, and contains the average thickness of the 4 microns of the photoresist adhesives of the fluorine system.

When it is easy to become uneven with the thickness of the middle substrate and priority is given to the homogeneity within the field, as for thickness t, it is desirable that it is the at least 20 microns or more. The pixel pitch is 14 microns.

TABLE 13

| (Comparative Example 11) micro lens n = 1.63, r = 10 μm | | | |
|---|---|---|---|
| t (μm) | CTF (%) | η (%) | α (%) |
| 21 | 59.4 | 66.6 | 79.4 |
| 24 | 40.5 | 82.8 | 55.0 |
| 33 | 37.8 | 74.7 | 58.9 |

TABLE 14

| (Comparative Example 12) micro lens n = 1.75, r = 10 μm | | | |
|---|---|---|---|
| t (μm) | CTF (%) | η (%) | α (%) |
| 19 | 79.4 | 53.1 | 57.5 |
| 22 | 54.2 | 64.8 | 53.4 |
| 26 | 70.0 | 57.6 | 50.3 |

It turns out that the way at the time of using the mirror can improve simultaneously at least two or more evaluation values in CTF, η, and α, and can make reduction of the remaining evaluation value the minimum so that the embodiment 18, the embodiment 19, and the examples 11 and 12 of comparison may be compared and may be known.

Figure 25:
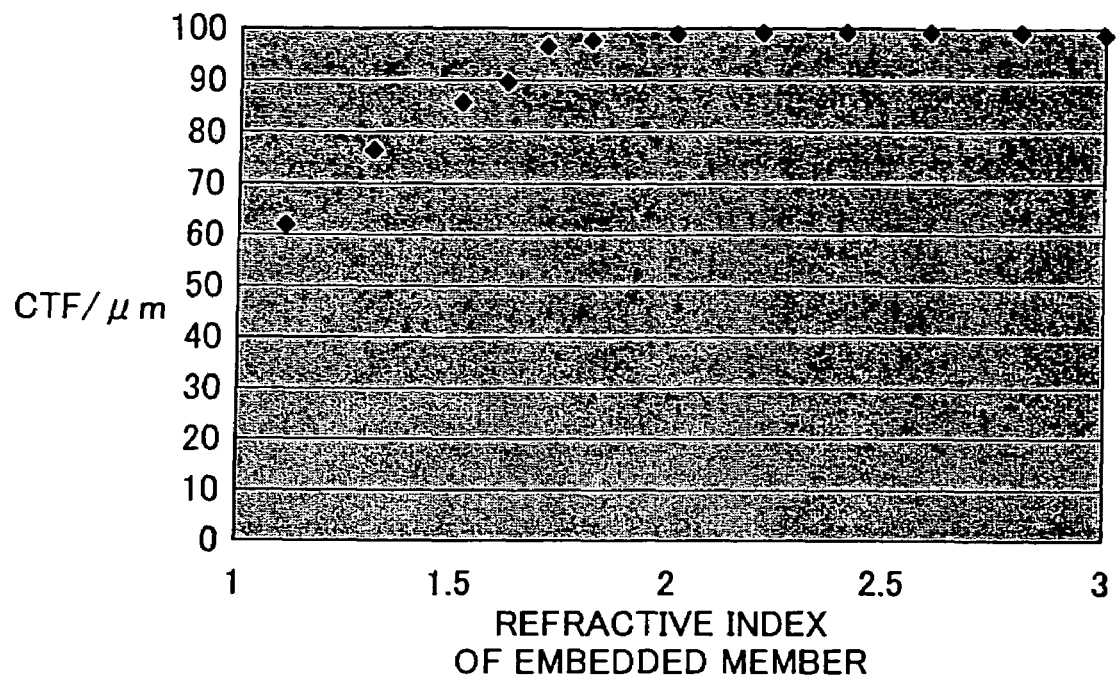
FIG. 25 is a diagram showing the evaluation value of the pixel reduction at the time of changing the index of refraction of the embedding layer.

The embodiment 20 used as the evaluation value of pixel reduction of the embodiment of FIG. 18 at the time of embedding in FIG. 25, when curvature r is fixed to the 100 microns, and changing the index of refraction of the layer to it is shown.

As shown in FIG. 25, the index of refraction of the embedding layer is desirably a larger one, and if the index of refraction is 1.6 or more, the optical use efficiency becomes 90% or more. That is, it is the optical loss of 1/10 or less, and a high optical use efficiency can be obtained.

Moreover, with the index of refraction of 1.7 or more, the optical use efficiency becomes about 97% or more, or the fixed use efficiency level. It is more desirable.

Since various transparent derivative materials can form the films or layers by the PCVD, the EB evaporation coating, the spattering, etc. with the index of refraction of 2.2 or less.

If the material with the index of refraction of 2.2 or less is used, the dry etching will easily be carried out. The rate of reduction remains almost unchanged as the index of refraction increase, but the optical use efficiency falls in such a case. Hence, it is desirable that the index of refraction is larger than 1.7 and less than 2.2.

As shown in the embodiment 20, the materials with the index of refraction of 1.6 or larger are more desirable than the usual transparent materials with the index of refraction of less than 1.6 and larger than 1.4; that is, $SiO_2$, BK7 and acrylic polymer, the "saitoppu", and the 1737 glass (Corning Co.). The focal distance f of the concave mirror (absolute value) is given by the formula f=r/(nd) where the radius of curvature r, the diameter d, and the index of refraction n, as mentioned above.

Figure 26:
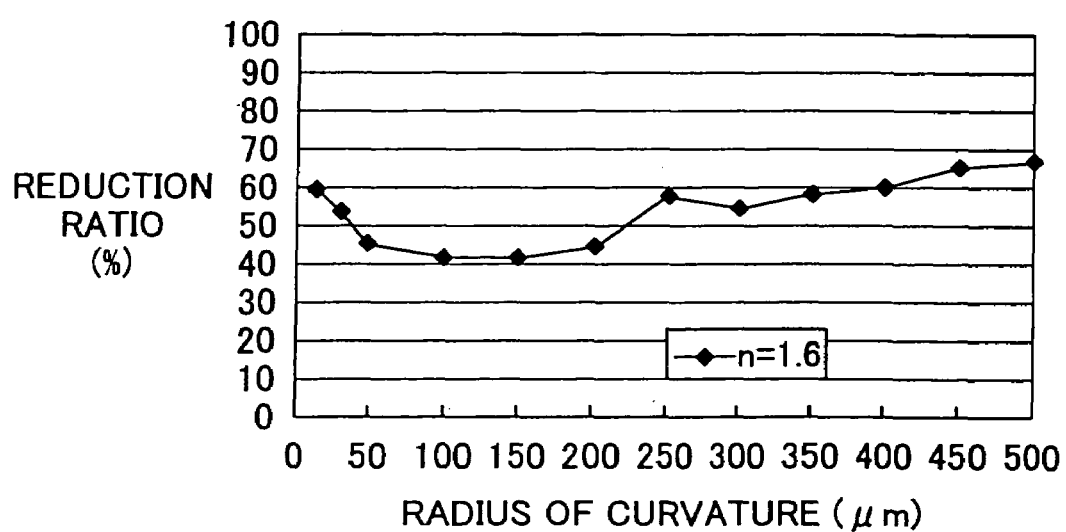
FIG. 26 is a diagram showing the rate of reduction which is the evaluation value of the pixel reduction when changing the curvature of a concave mirror.
Figure 27:
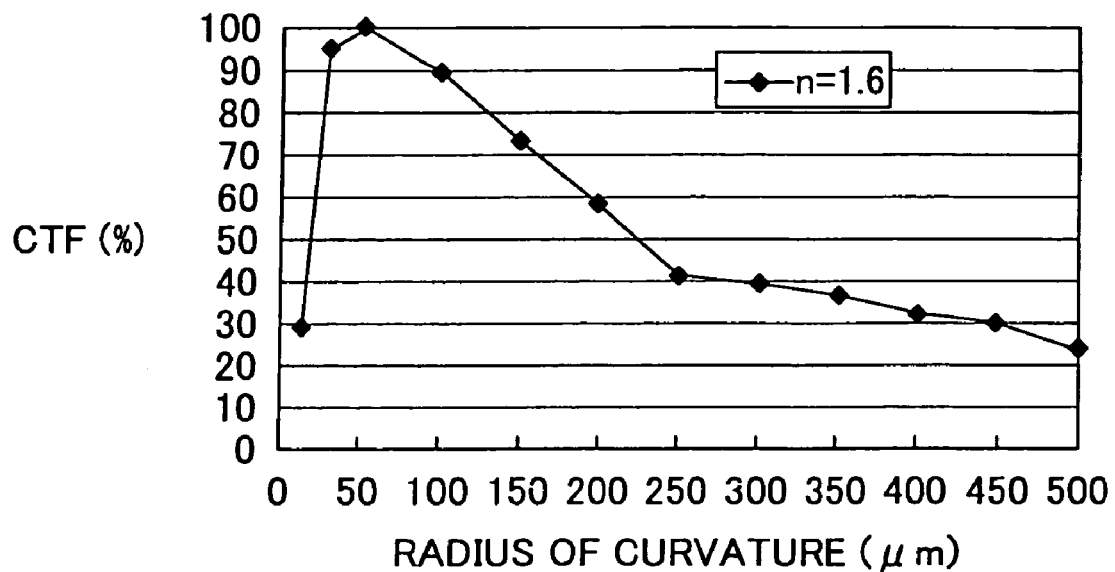
FIG. 27 is a diagram showing the CTF which is the evaluation value of the pixel reduction when changing the curvature of a concave mirror.

FIG. 26 shows the rate of reduction which is the evaluation value of the pixel reduction in the embodiment 21 of the invention when changing the curvature of the concave mirror. FIG. 27 shows the CTF which is the evaluation value of the pixel reduction in the embodiment 21 of the invention when changing the curvature of the concave mirror.

In the embodiment 21, the embedding layer has the index of refraction n=1.6, and the pixel pitch is 14 microns.

As shown in FIG. 26, as for the rate of reduction, it is desirable that the radius of curvature is larger than 30 microns and smaller than 250 microns. It is more desirable that the radius of curvature is larger than 50 microns and smaller than 200 microns.

As shown in FIG. 27, like FIG. 26, the CTF changes rapidly and it is desirable that the radius of curvature is larger than 30 microns and smaller than 250 microns. It is more desirable that the radius of curvature is larger than 50 microns and smaller than 200 microns.

In this embodiment, the rate of reduction is larger than 40% and smaller than 50%. It is not a faulty reduction that degrades the image quality.

The pixel profile is not the rectangle configuration, and it is possible to secure a CTF in the range of 50% or more.

Thus, by using the optical-axis shift unit to the reduced pixel which deformed the pixel profile, the image display apparatus which realizes the very high-definition image which can realize the resolution and the smoothness of the image simultaneously is realizable.

The pixel pitch in the embodiment 21 is 14 microns. In the embodiment 21, the beam profile deformation unit is configured as an optical element including a concave mirror plane having a curved surface, and configured to meet the formula: $2.2/(m/2)<r/d<17.9/(m/2)$ where m indicates the number of modulation steps of the light-path modulation unit, d is a diameter of the concave mirror plane having the curved surface, and r is an average radius of curvature of the concave mirror plane.

Moreover, in the embodiment 21, the embedding layer having the index of refraction of 1.6 or more is taken into consideration. The beam profile deformation unit in this embodiment is configured as an optical element including a concave mirror plane having a curved surface, and configured to meet the formula: $1.1/(m/2)<n \times Fr<8.9/(m/2)$ where Fr indicates an F value of the concave mirror plane, m indicates the number of modulation steps of the light-path modulation unit, and n is an index of refraction of the embedding layer of the beam profile deformation unit.

Furthermore, in the embodiment 21, the Fi value being 4 is considered. The beam profile deformation unit in this embodiment is configured as an optical element including a concave mirror plane having a curved surface, and configured to meet the formula: $0.27/(m/2)<n \times (Fr/Fi)<2.21(m/2)$ where Fr indicates an F value of the concave mirror plane, Fi indicates an F value of the irradiation beam incident to the optical modulators, m indicates the number of modulation steps of the light-path modulation unit, and n is an index of refraction of the embedding layer of the beam profile deformation unit.

Figure 28:
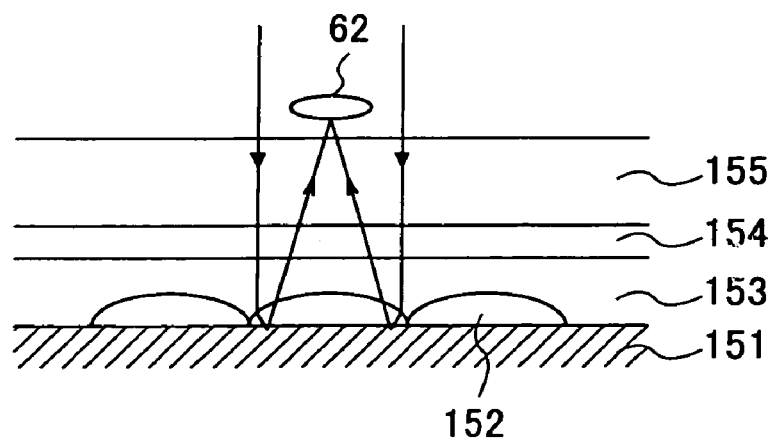
FIG. 28 is a diagram showing one embodiment of the present invention when the micro lens and the mirror plane are united.

FIG. 28 shows the embodiment 22 of the image display apparatus of the present invention when the micro lens and the mirror plane are united.

In FIG. 28, reference numeral 151 is the back plain having the upper surface reflector, 152 is the micro lens, 153 is the flattened layer, 154 is the liquid crystal layer, and 155 is the opposite substrate.

Although illustration has not been carried out, the ITO electrode, the contact hole, etc. whose liquid crystal layer is included as in FIG. 18 are formed.

In this embodiment, the almost same pixel profile as FIG. 18 can be deformed by the micro lens being united with the reflector, and being arranged the light source side to the liquid crystal layer at the opposite side.

Simultaneously, since the mirror can be constituted from the flat surface, production becomes easier, yield's can improve and can consider as low cost.

The configuration of the micro lens serves twice simultaneous in the same part, and the curvature may be small. The production process becomes easy, and the yield also becomes small.

Besides embedding and carrying out the flattening of the micro lens of the convex configuration with the high index of refraction with the material of the low index of refraction, it is possible to embed and form the micro lens of the shape of a concave of the low index of refraction with the material of the high index of refraction.

Figure 29:
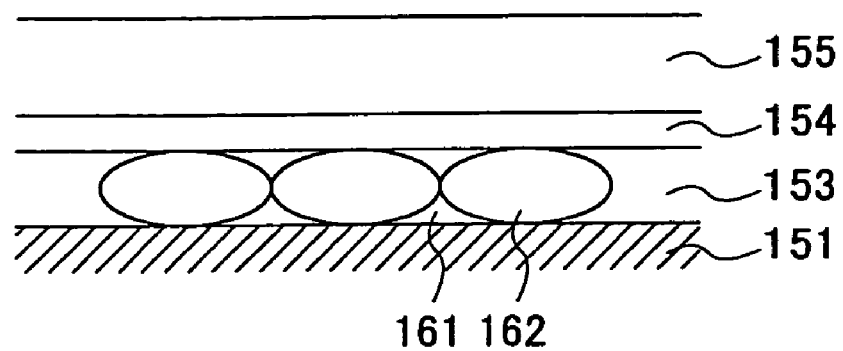
FIG. 29 is a diagram showing another embodiment of the present invention when the micro lens and the mirror plane are united.

FIG. 29 shows the embodiment 23 of the image display apparatus of the present invention when the micro lens and the mirror plane are united.

In FIG. 29, reference numeral 151 is the back plain having the upper surface reflector, 161 is the micro lens lower layer, 162 is the micro lens, 153 is the flattened layer, 154 is the liquid crystal layer, and 155 is the opposite substrate.

Although illustration has not been carried out, the ITO electrode, the contact hole, etc. whose liquid crystal layer is included as in FIG. 18 are formed.

In the embodiment, the micro lens is the same as that of the case where the reflector and the micro lens are united like FIG. 28, by being in the opposite side of the liquid crystal layer as an optical action, although separated by the concave surface configuration material and the lower layer 161.

In the case, since the number of the fields of the lens can be increased, the yield of the lens can be reduced more and the image display of the high resolution can be performed by controlling the pixel profile more.

Moreover, by making thickness of the lens thin, the absolute value of dispersion in the thickness of the flattened layer in the case of the polish produced by the stress corresponding to the concavo-convex configuration can also be decreased, the gap is more uniform and the image display apparatus with little dispersion within the field with the high contrast can be offered.

Figure 30:
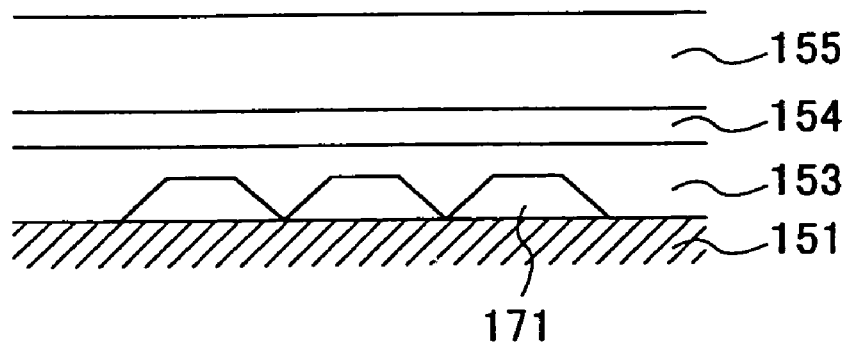
FIG. 30 is a diagram showing another embodiment of the present invention when the micro prism and the mirror plane are united.

FIG. 30 shows the embodiment 24 of the image display apparatus of the present invention when the micro prism and the mirror plane are united.

In FIG. 30, reference numeral 151 is the back plain having the upper surface reflector, 171 is the micro prism, 153 is the flattened layer, 154 is the liquid crystal layer, and 155 is the opposite substrate.

Although illustration has not been carried out, the ITO electrode, the contact hole, etc. whose liquid crystal layer is included as in FIG. 18 are formed.

In the embodiment, the almost same pixel profile as FIG. 18 can be deformed by the micro prism being united with the reflector, and being arranged the light source side to the liquid crystal layer as in FIG. 28, at the opposite side.

Simultaneously, since the mirror and the prism can be constituted from the flat surface, production becomes easier, yield's can improve and can consider as low cost.

Figure 31:
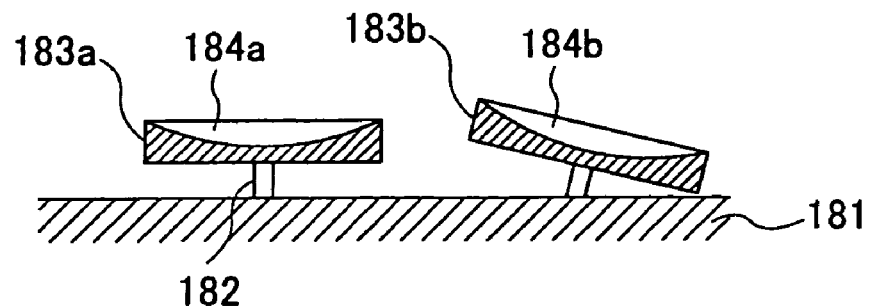
FIG. 31 is a diagram showing another embodiment of the present invention when the modulation layer and the concave mirror are united.

FIG. 31 shows the embodiment 25 of the image display apparatus of the present invention when the modulation layer and the concave mirror plane are united.

In FIG. 31, reference numeral 181 is the back plain having the SRAM, 182 is the hinge pillar, 183a and 183b are the concave mirror movable parts, and 184a and 184b are the flattened layers of the concave mirror.

In this embodiment, the movable parts 183a and 183b are the modulation layers which are produced with the MEMS technique and perform the optical modulation by the deviation control. They are a reflection-type element which performs the digital modulation of zero and one for the reflection light with the two states: the state of the parts 183a and 184a and the state of the parts 183b and 184b.

In this embodiment, while the almost same pixel profile as FIG. 18 can be deformed by forming the concave mirror configuration in the portion used as the movable mirror, since the pixel reduction in the impossible deviated type optical modulator is realizable, the high contrast of the deviated type optical modulator is realizable with the conventional micro-lens opposite substrate.

The restriction of the pixel pitch which has the limitation according to the MEMS configuration can be simultaneously solved by optical-axis shift, and the image display apparatus of the high resolution can be realized.

Since the flattened layer can make the focal distance of the concave mirror small, it is effective for the image display apparatus.

Besides the concave mirror configuration, it is possible to constitute the micro lens on the plane mirror.

Figure 32:
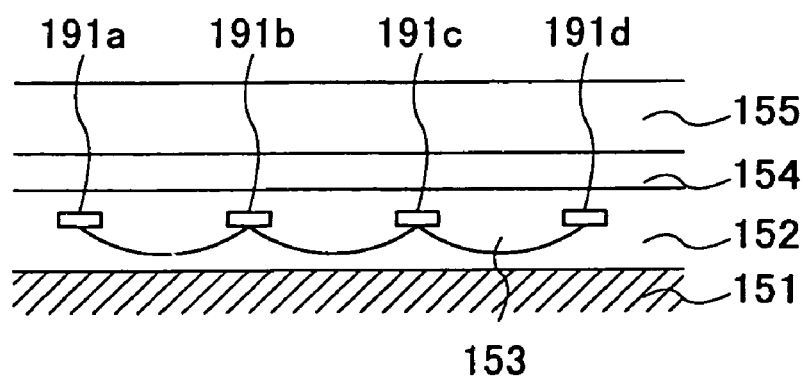
FIG. 32 is a diagram showing one embodiment of the present invention when using the shading layer for the spatial optical modulator.

FIG. 32 shows the embodiment 26 of the image display apparatus of the present invention at the time of using the shading layer for the spatial optical modulator.

In FIG. 32, reference numeral 151 is the back plain having the upper surface reflector, 152 is the micro lens, 153 is the flattened layer, 154 is the liquid crystal layer, 155 is the opposite substrate, and 191a-191d are the black matrix layers prepared around the concave mirror in the shape of a lattice.

Although illustration has not been carried out, the ITO electrode, the contact hole, etc. whose liquid crystal layer is included as in FIG. 18 are formed.

In this embodiment, by masking the large portion of the yield of the concave mirror at the same time it can reduce the scattered light near the edge of the concave mirror and improves the contrast, the black matrix layers 91a-91d can reduce the pixel size more, and the image display apparatus of this embodiment can provide higher resolution imaging.

The reflection-type light valve of FIG. 18 is not limited to the above-described embodiments, and it is applicable to a space type light exchange switch for optical communications. Alternatively, it is applicable to an optical-information-processing circuit device by combining the flat-surface type light-receiving unit, the operational circuit, the flat-surface type light emitting element, the micro-lens multi-stage array, etc.

The present invention is not limited to the above-described embodiments, and variations and modifications may be made without departing from the scope of the present invention.

Further, the present invention is based on Japanese priority application No. 2002-049840, filed on Feb. 26, 2002, and Japanese priority application No. 2002-048010, filed on Feb. 25, 2002, the entire contents of which are hereby incorporated by reference.

What is claimed is:

1. An optical component for use in an image display apparatus, comprising:
   an indicating element configured to modulate or emit light as a pixel in accordance with image information; and
   a pixel-profile deformation unit configured to deform an optical intensity profile of the pixel, wherein
   the pixel-profile deformation unit is further configured to deform the optical intensity profile of the pixel into a pixel profile of a non-rectangle configuration, and
   the pixel of the pixel profile produced by the pixel-profile deformation unit has a concave portion near a center of the pixel.

2. The optical component of claim 1, wherein the pixel-profile deformation unit deforms the optical intensity profile so as to meet the formula: $w \leq 0.7 \, p \times (2/n)$ where w is a full width at half maximum of the resulting pixel profile, p is a pixel pitch, and n is an integer above 2 and indicates the number of steps in which displacement is carried out by a displacement unit.

3. The optical component of claim 1, wherein the pixel-profile deformation unit deforms the optical intensity profile so that a minimum optical intensity of a continuation pixel profile produced from two or more continuous pixel profiles produced by the pixel-profile deformation unit is less than 43% of a maximum optical intensity of the continuation pixel profile.

4. The optical component of claim 1, wherein the pixel-profile deformation unit includes a micro-lens array which is formed with a curved surface.

5. The optical component of claim 1, wherein the pixel-profile deformation unit includes a gradient-index lens array in which a refractive index is distributed therein.

6. The optical component of claim 1, wherein the pixel-profile deformation unit includes a concave surface mirror array having a concave surface mirror.

7. The optical component of claim 1, wherein the pixel-profile deformation unit includes an aperture array having an area smaller than an area of the original pixel.

8. The optical component of claim 1, further comprising a displacement unit configured to optically displace a position of the pixel, the optical intensity profile of the pixel being deformed by the pixel-profile deformation unit, for each of two or more sub-fields constituting an image field corresponding to the image information.

9. An image display apparatus in which an optical component is provided, the optical component comprising:
   an indicating element configured to modulate or emit light as a pixel in accordance with image information; and
   a pixel-profile deformation unit configured to deform an optical intensity profile of the pixel, wherein
   the pixel-profile deformation unit deforms the optical intensity profile so that a minimum optical intensity of a continuation pixel profile produced from two or more continuous pixel profiles produced by the pixel-profile deformation unit is less than 43% of a maximum optical intensity of the continuation pixel profile.

10. The image display apparatus of claim 9, wherein the pixel-profile deformation unit includes a micro-lens array which is formed with a curved surface.

11. The image display apparatus of claim 9, wherein the pixel-profile deformation unit includes a gradient-index lens array in which a refractive index is distributed therein.

12. The image display apparatus of claim 9, wherein the pixel-profile deformation unit includes a concave surface mirror array having a concave surface mirror.

13. The image display apparatus of claim 9, wherein the optical component further comprises a displacement unit configured to optically displace a position of the pixel, the optical intensity profile of the pixel being deformed by the pixel-profile deformation unit, for each of two or more sub-fields constituting an image field corresponding to the image information.

* * * * *